Dec. 29, 1931.  L. A. WATTERS ET AL  1,838,647
CALCULATING MACHINE
Filed Feb. 11, 1925  22 Sheets-Sheet 1
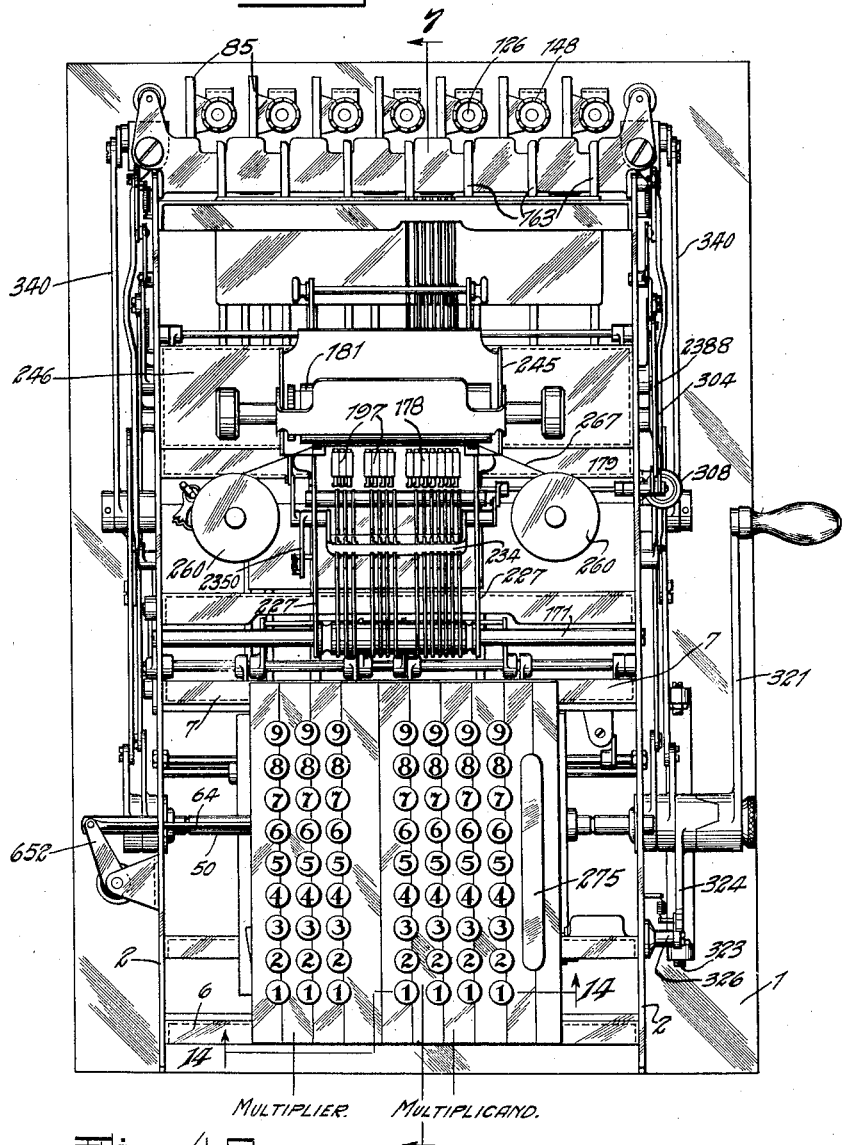

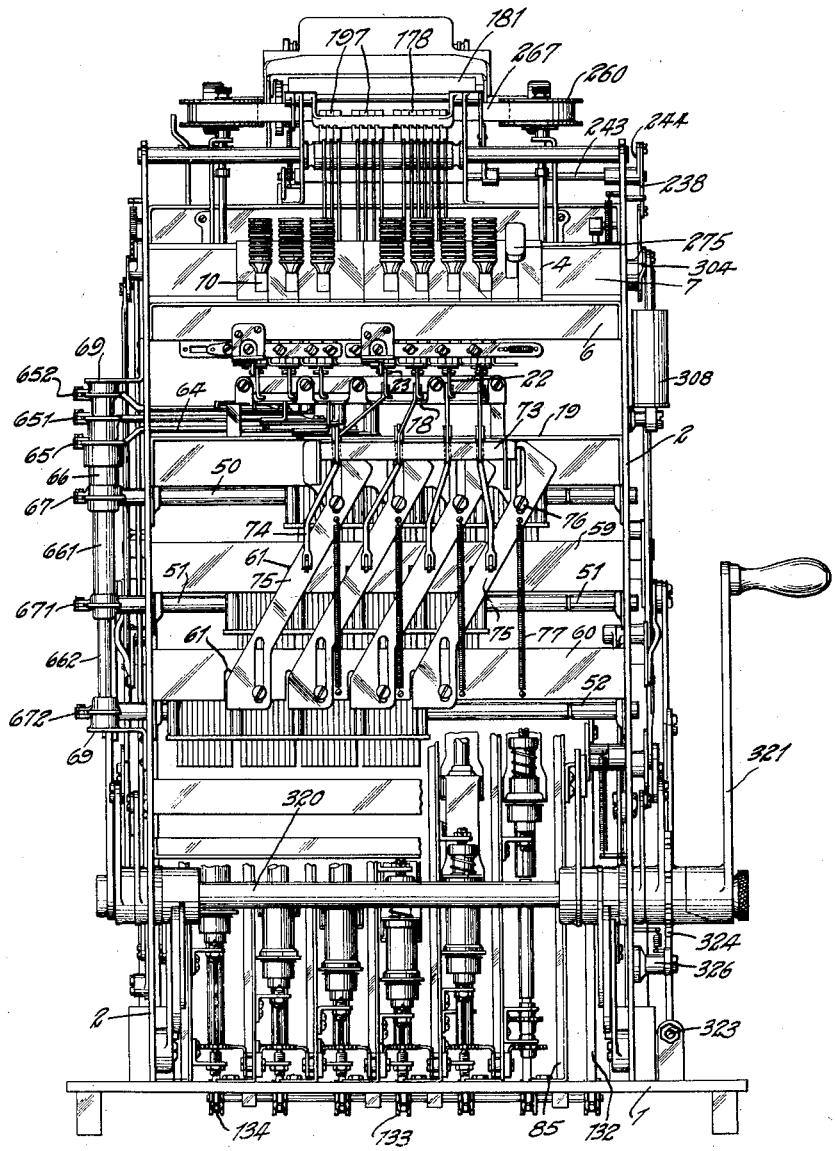

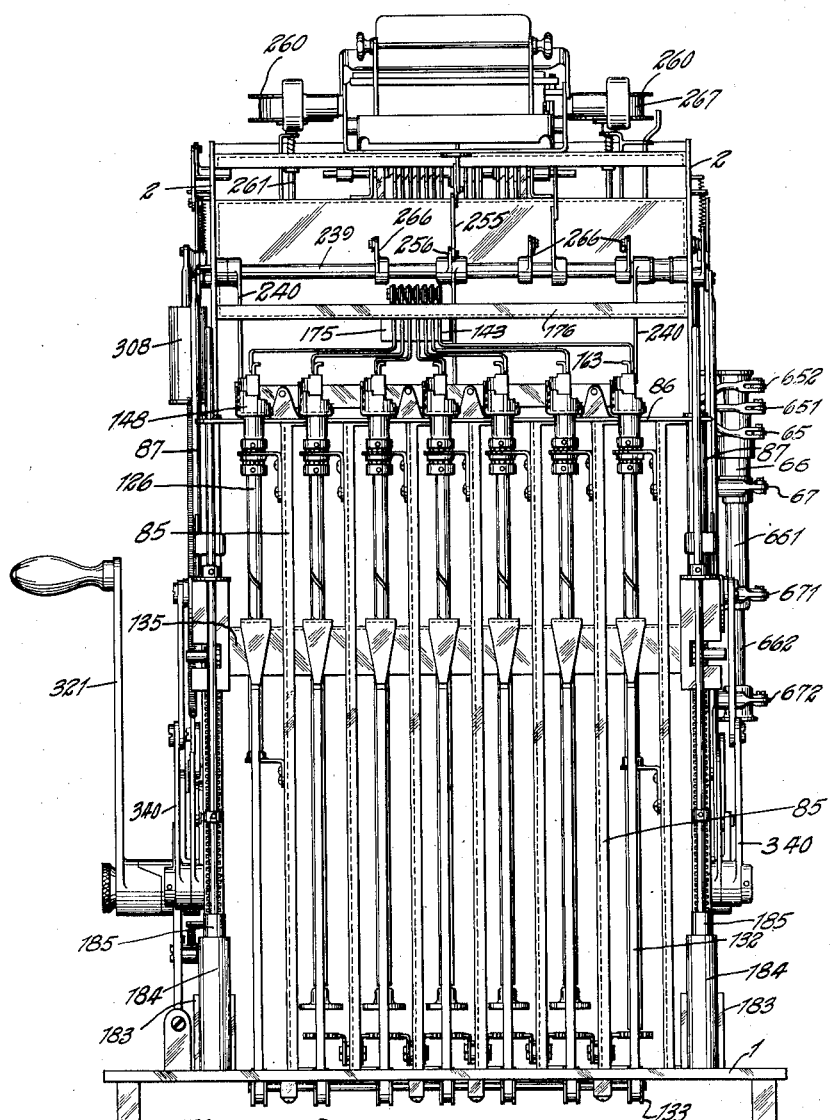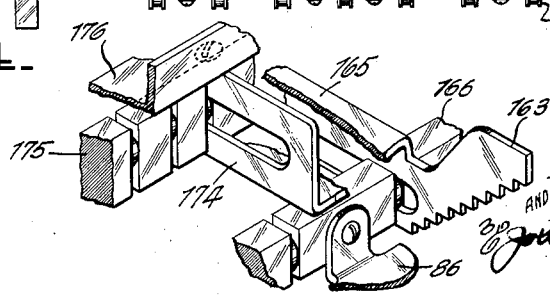

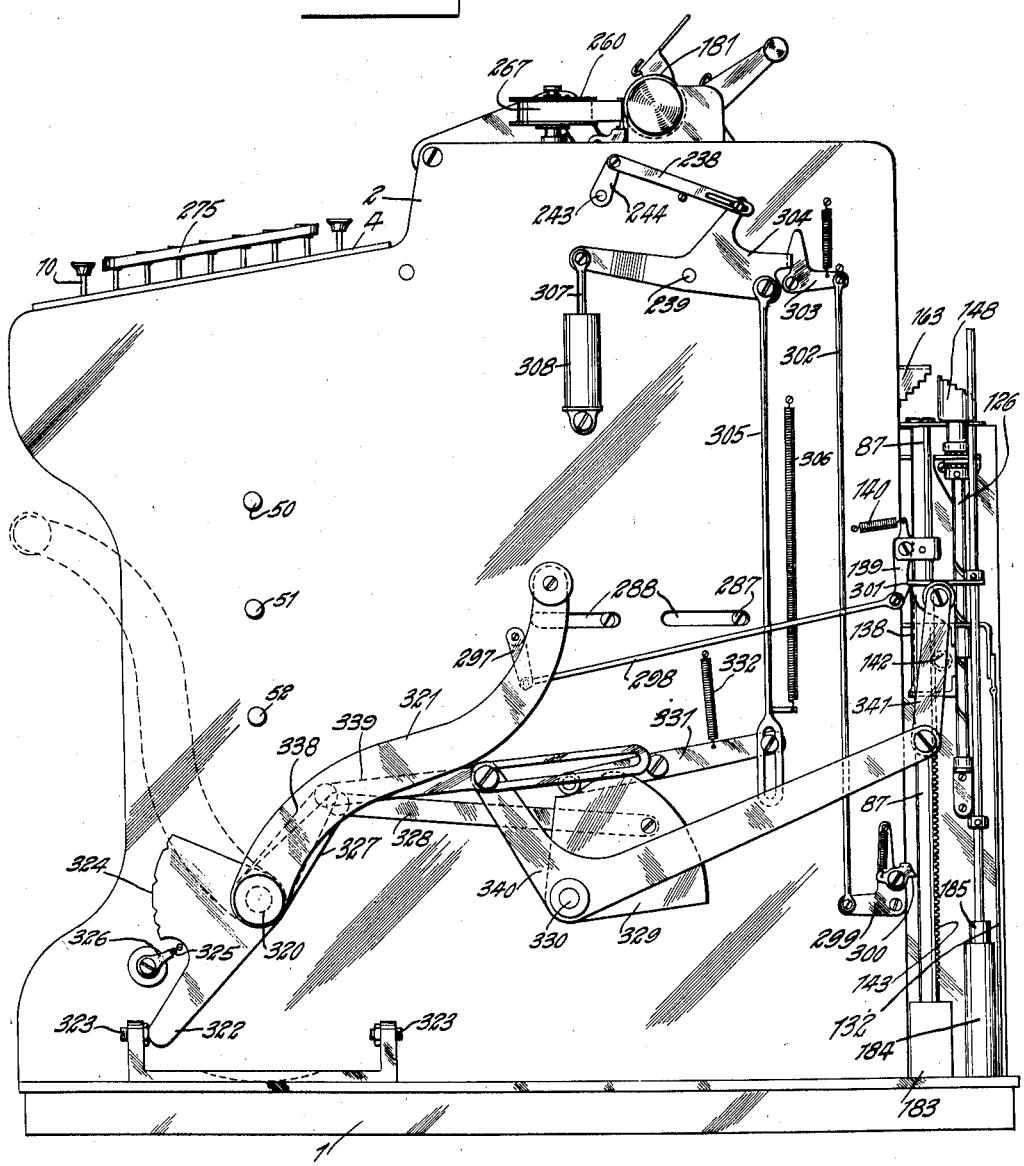

Fig. 6.

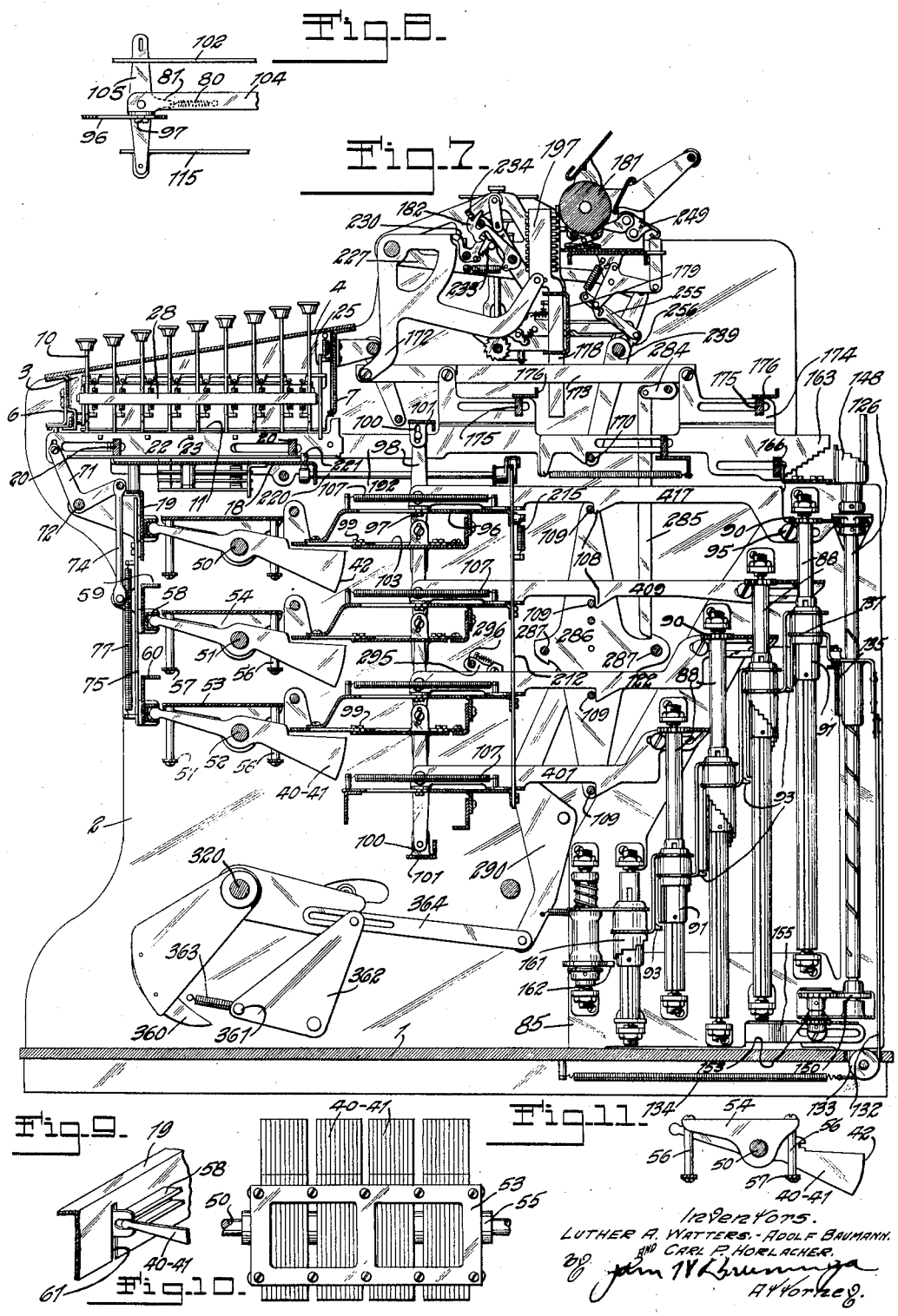

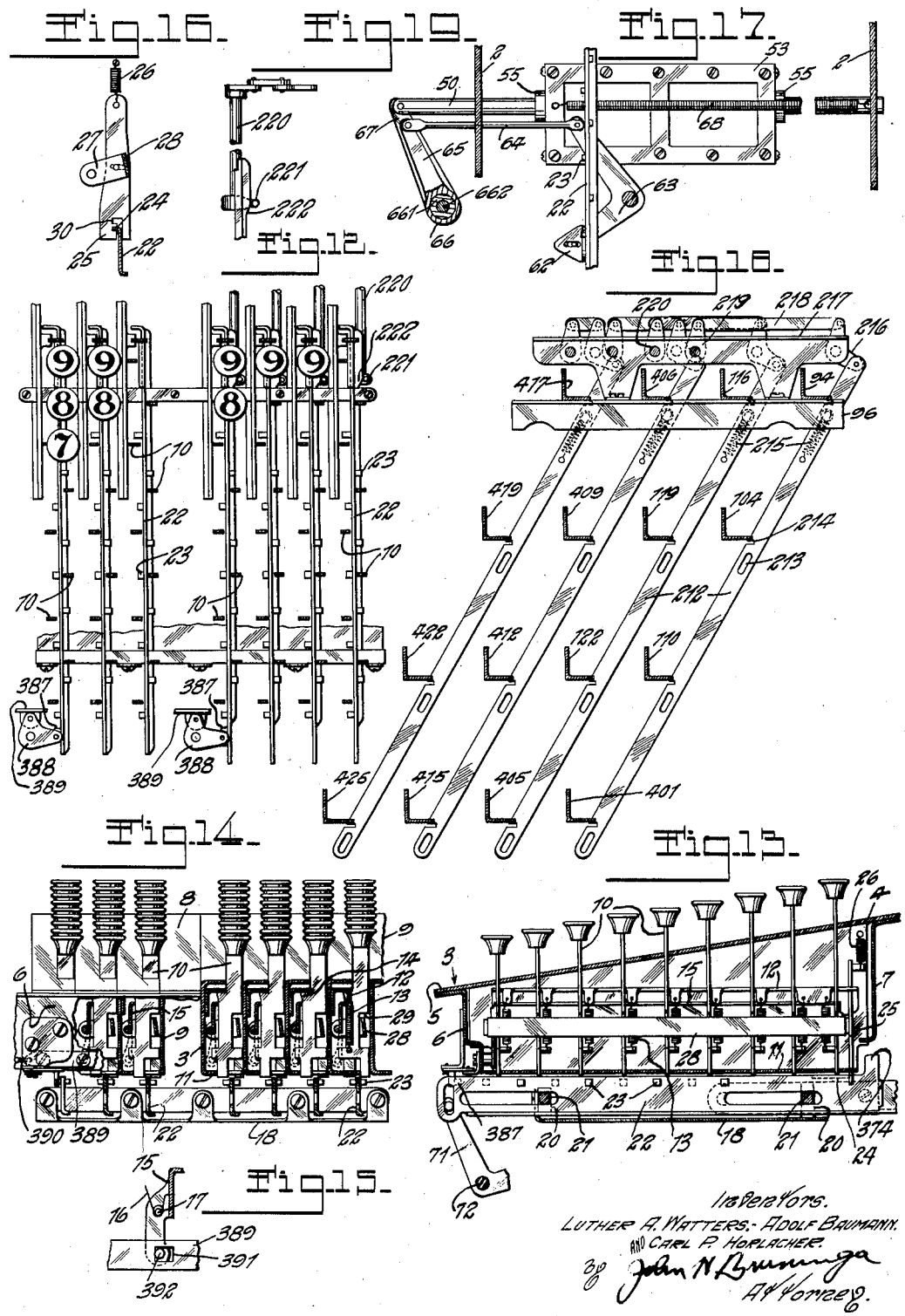

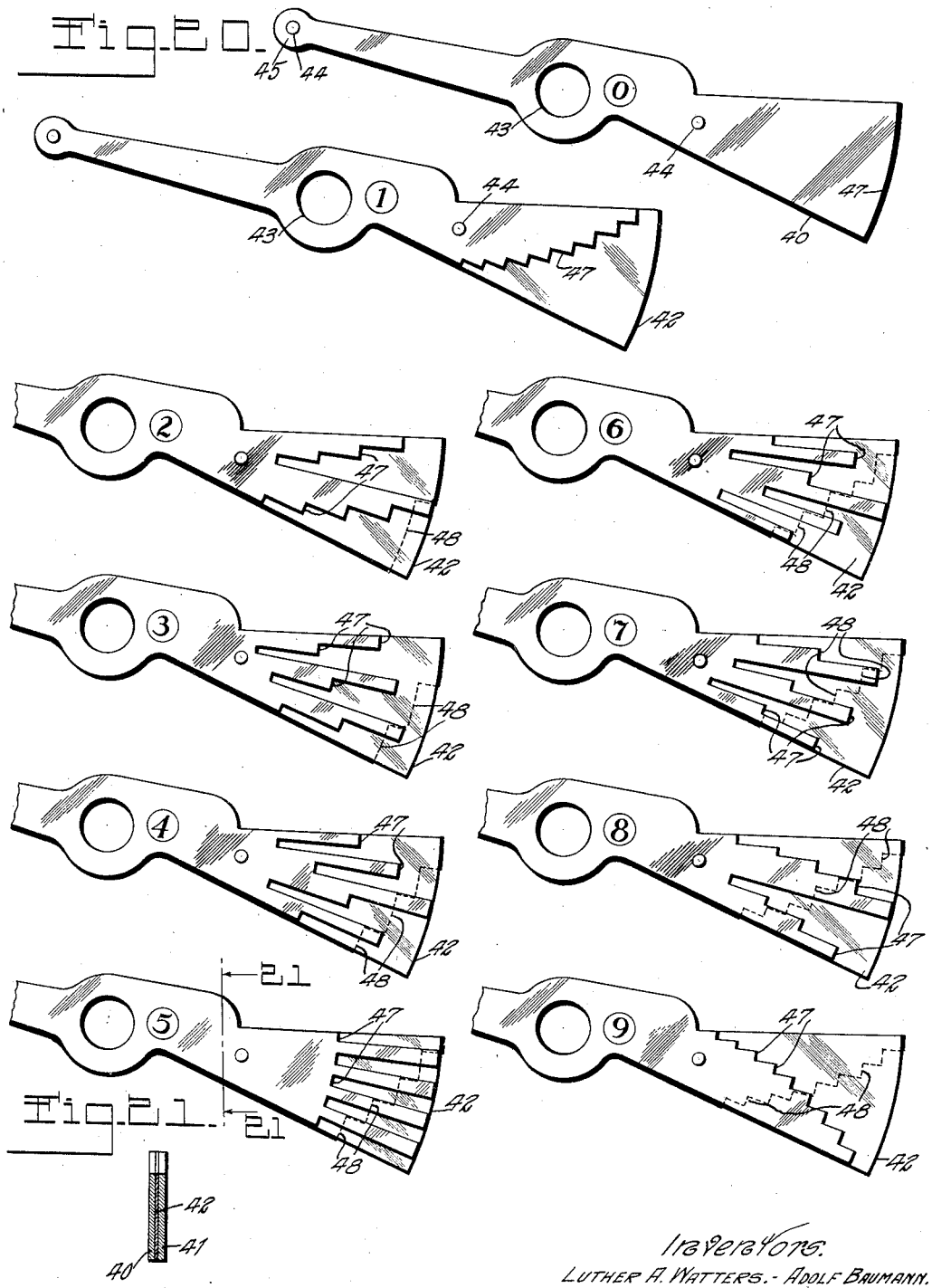

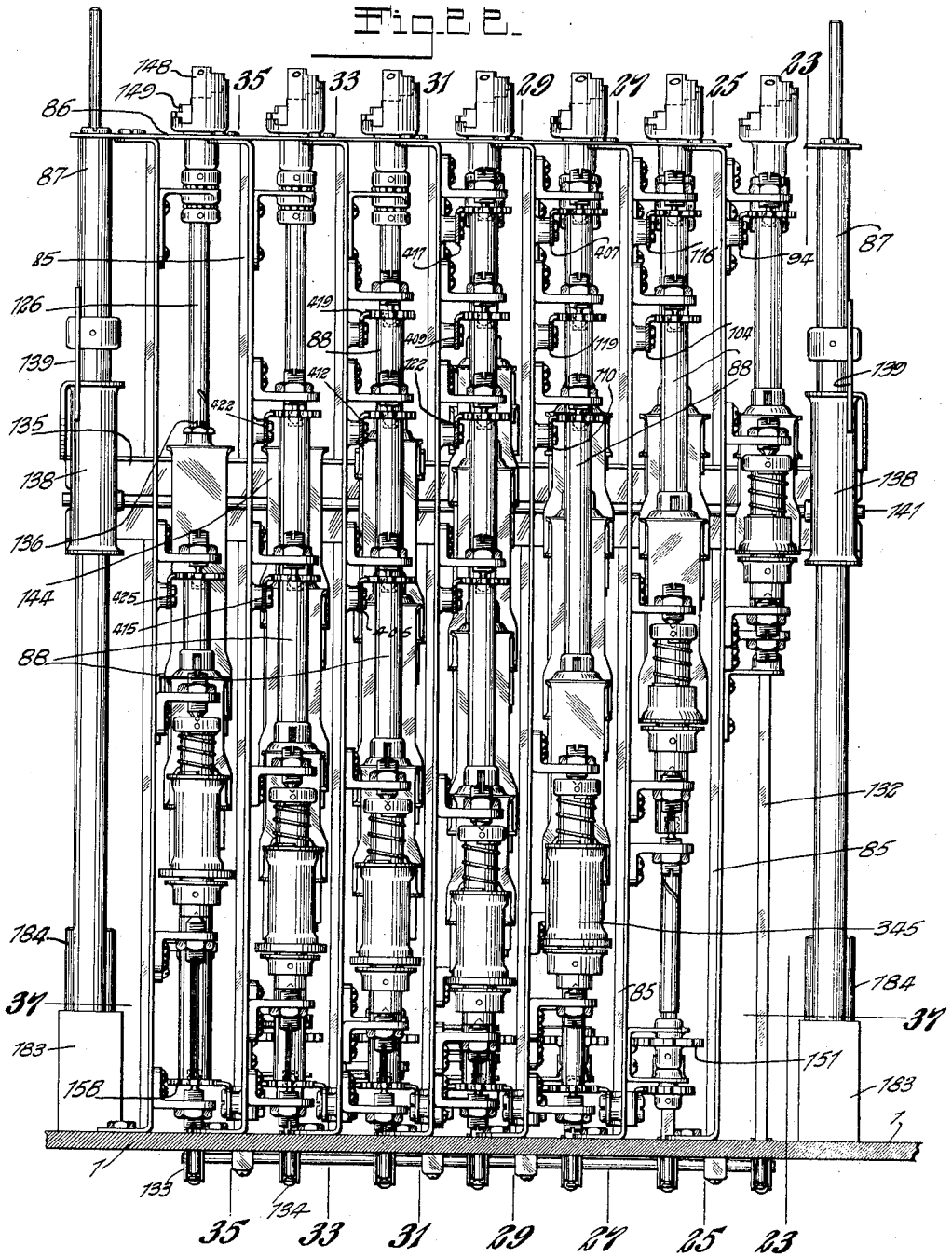

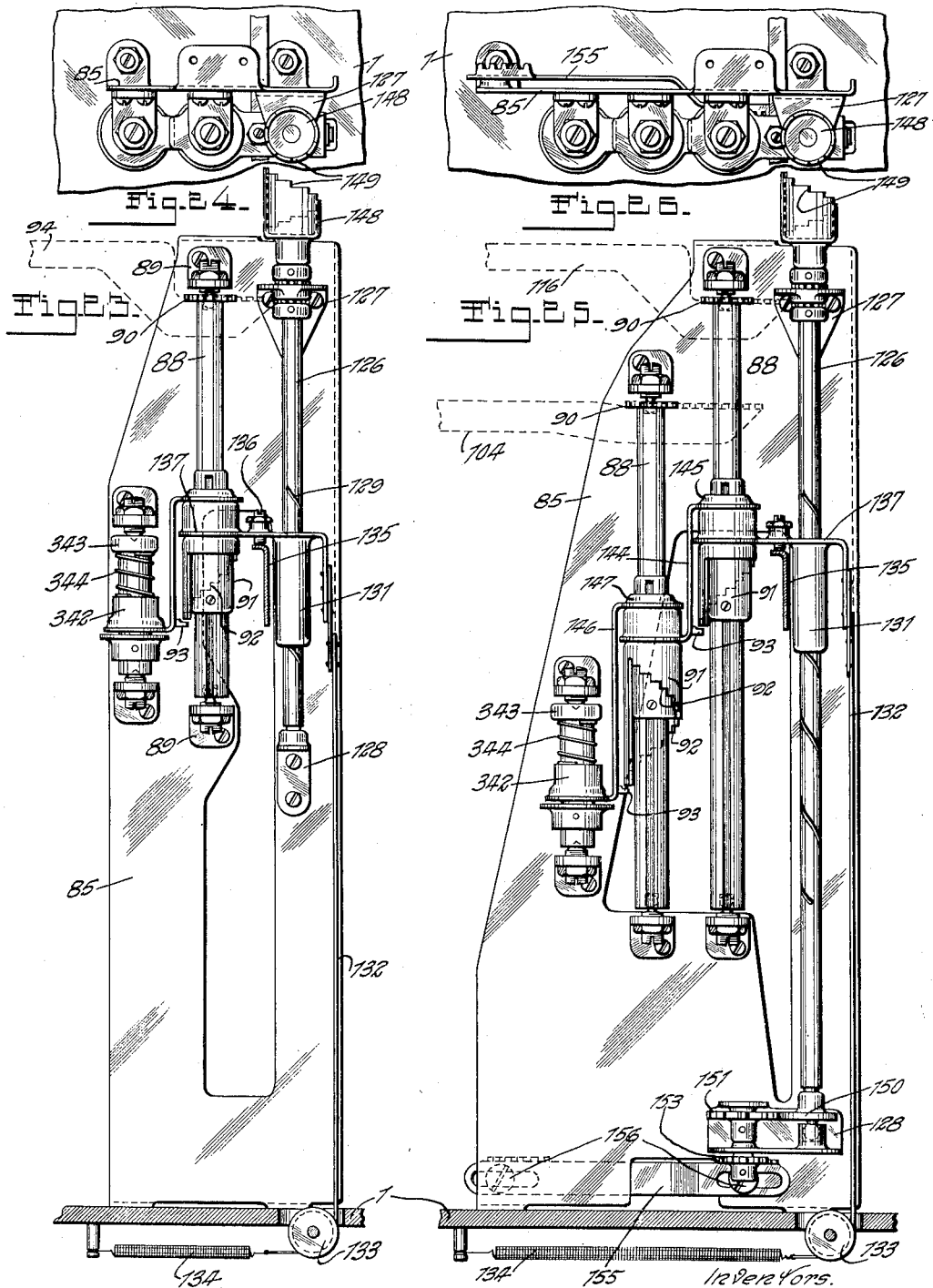

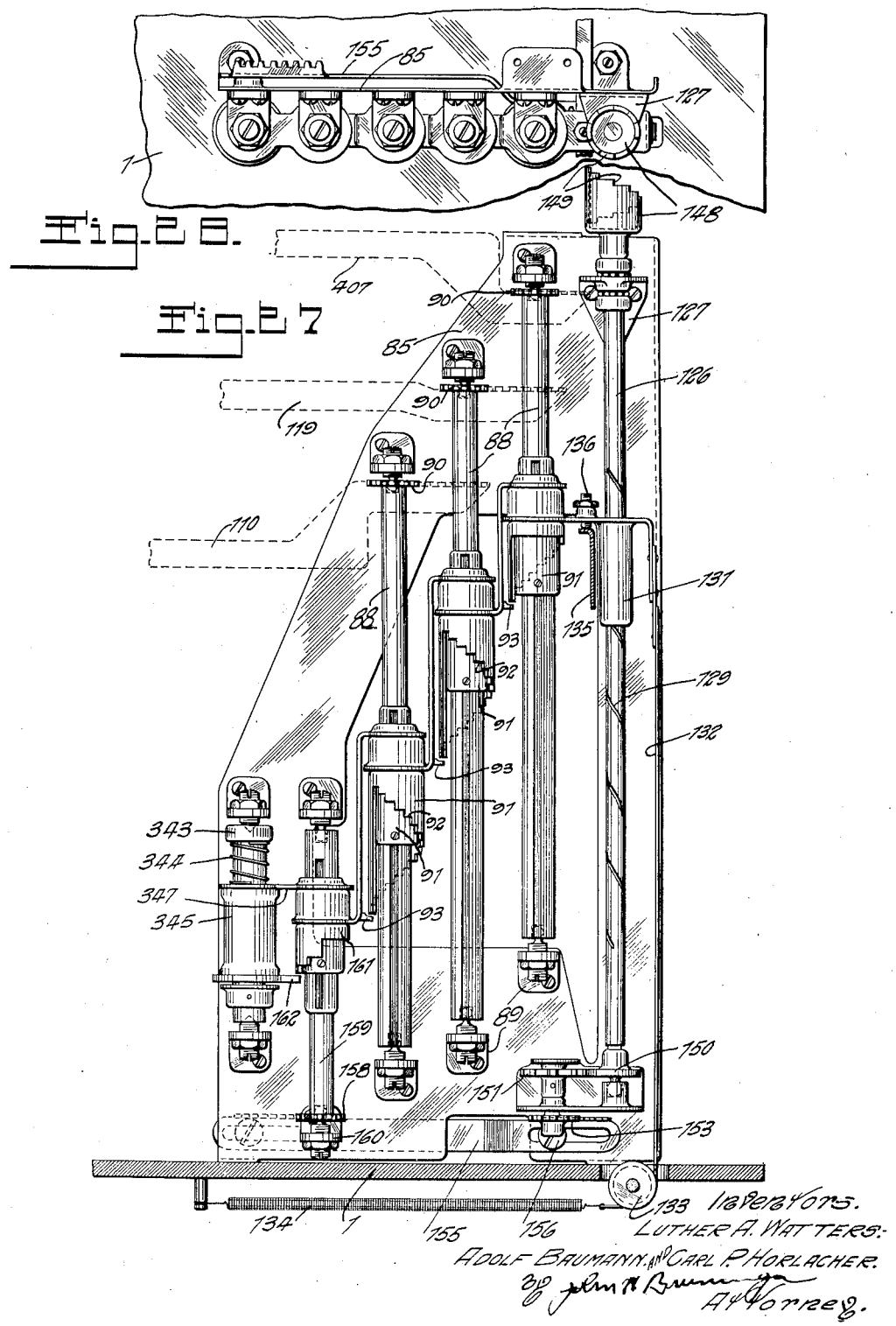

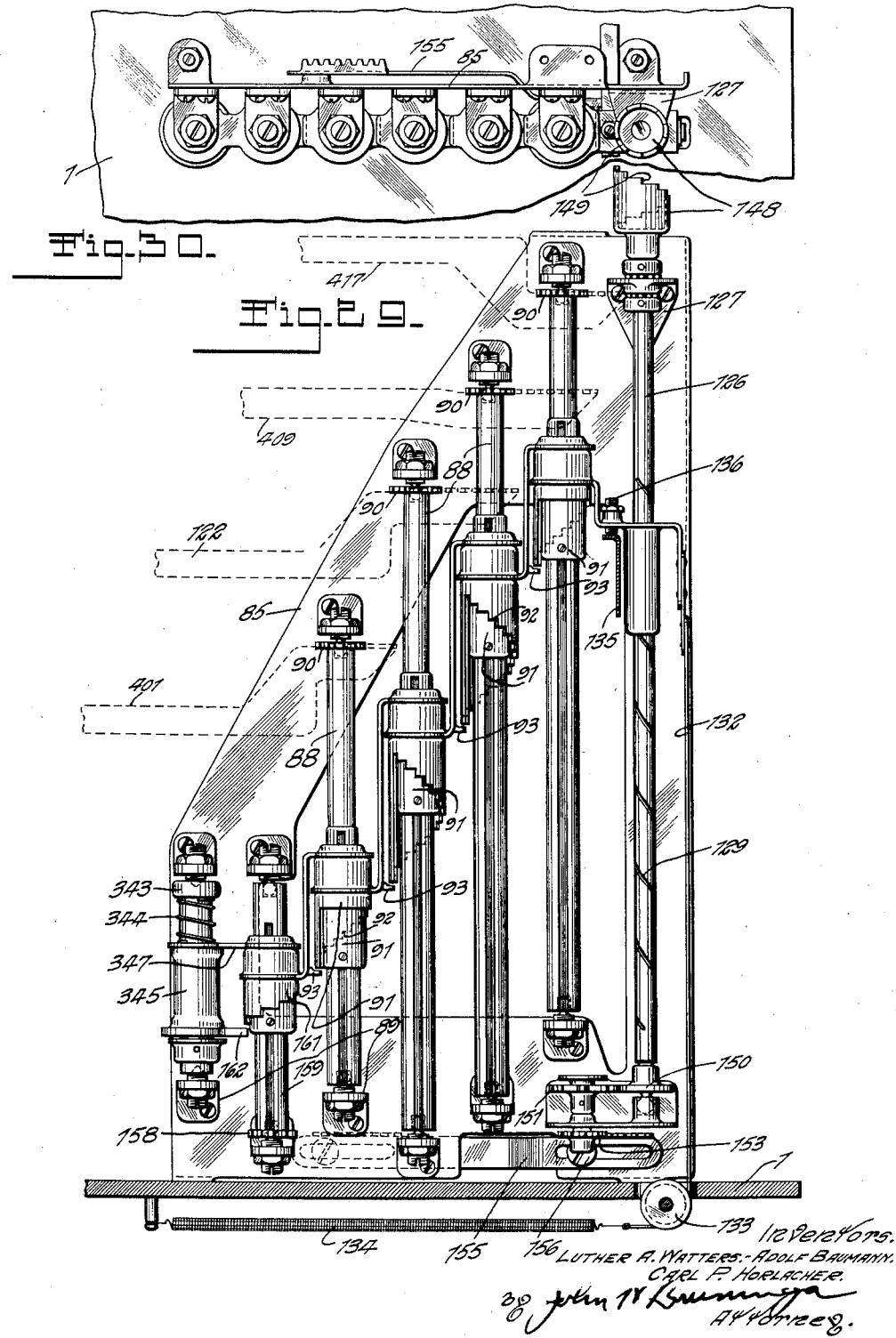

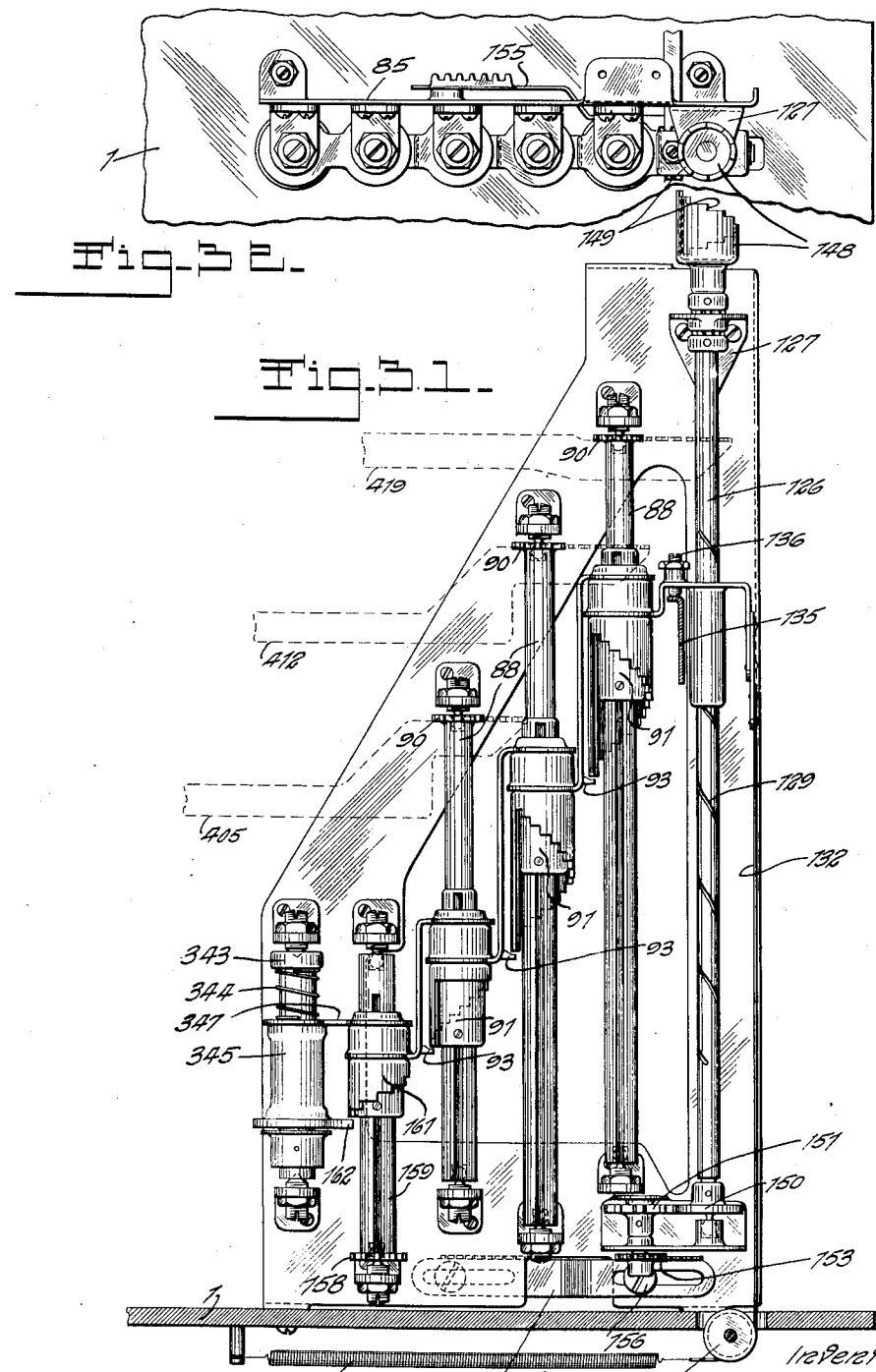

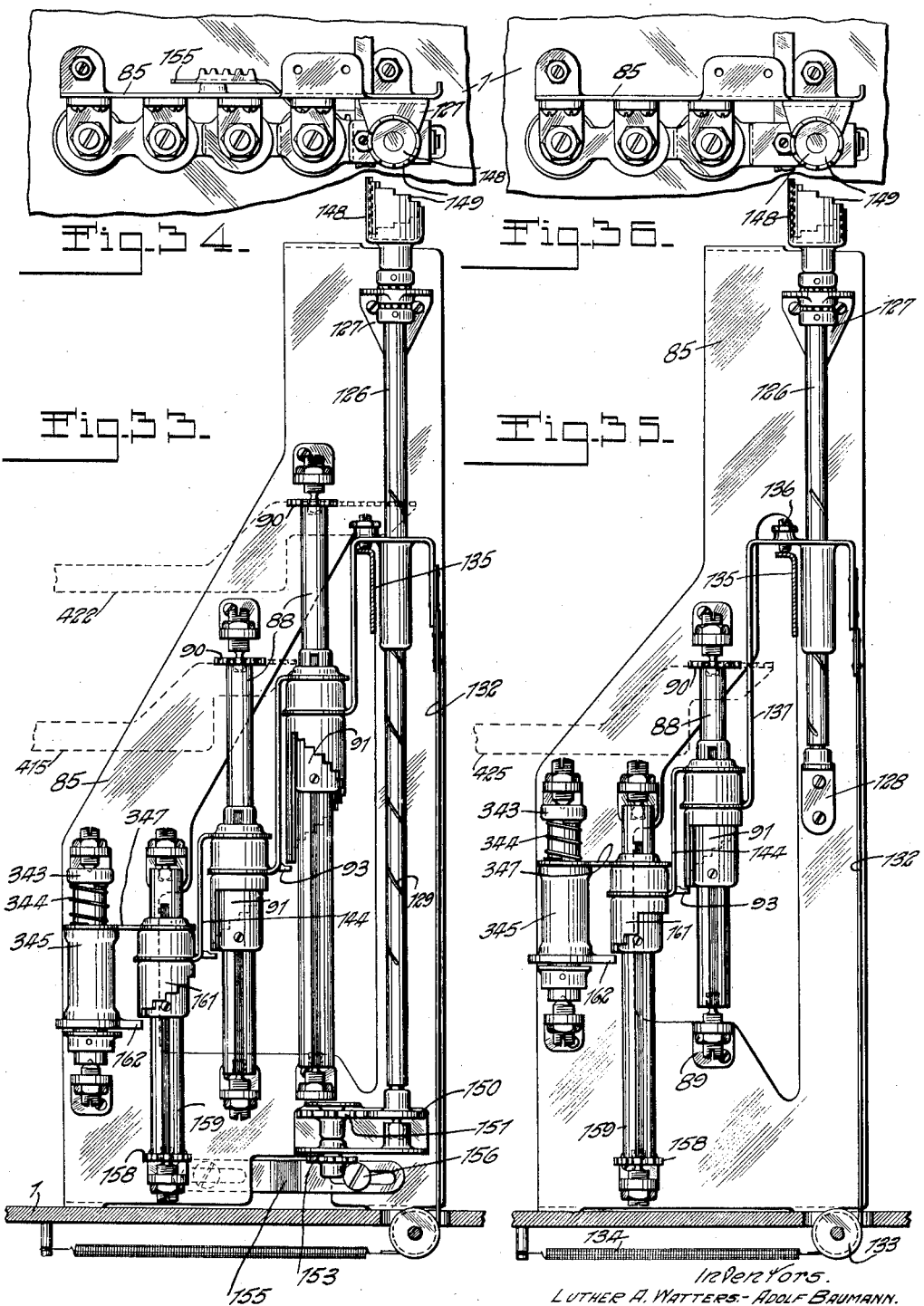

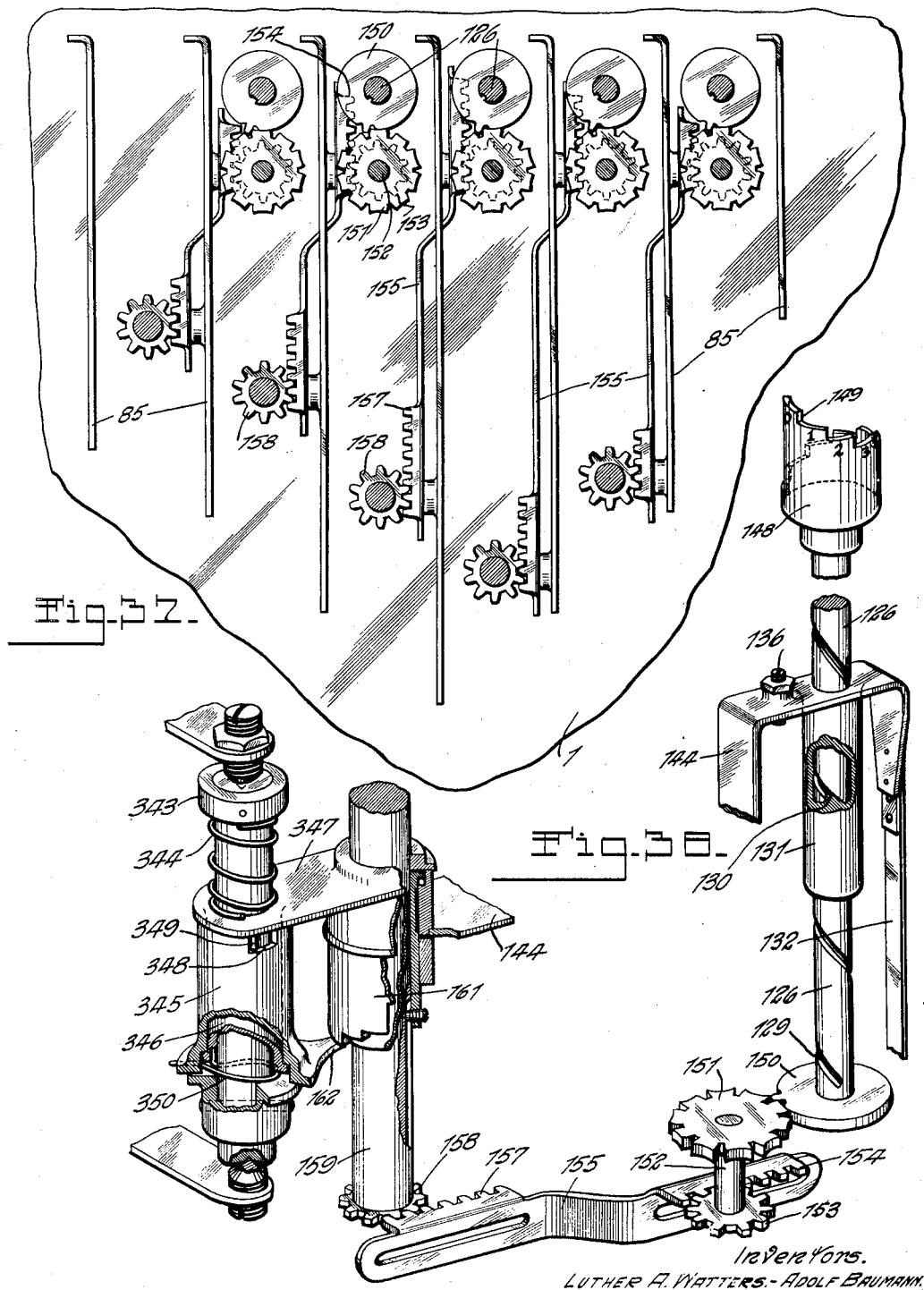

Dec. 29, 1931. L. A. WATTERS ET AL 1,838,647
CALCULATING MACHINE
Filed Feb. 11, 1925 22 Sheets-Sheet 16

Dec. 29, 1931.  L. A. WATTERS ET AL  1,838,647
CALCULATING MACHINE
Filed Feb. 11, 1925  22 Sheets-Sheet 17
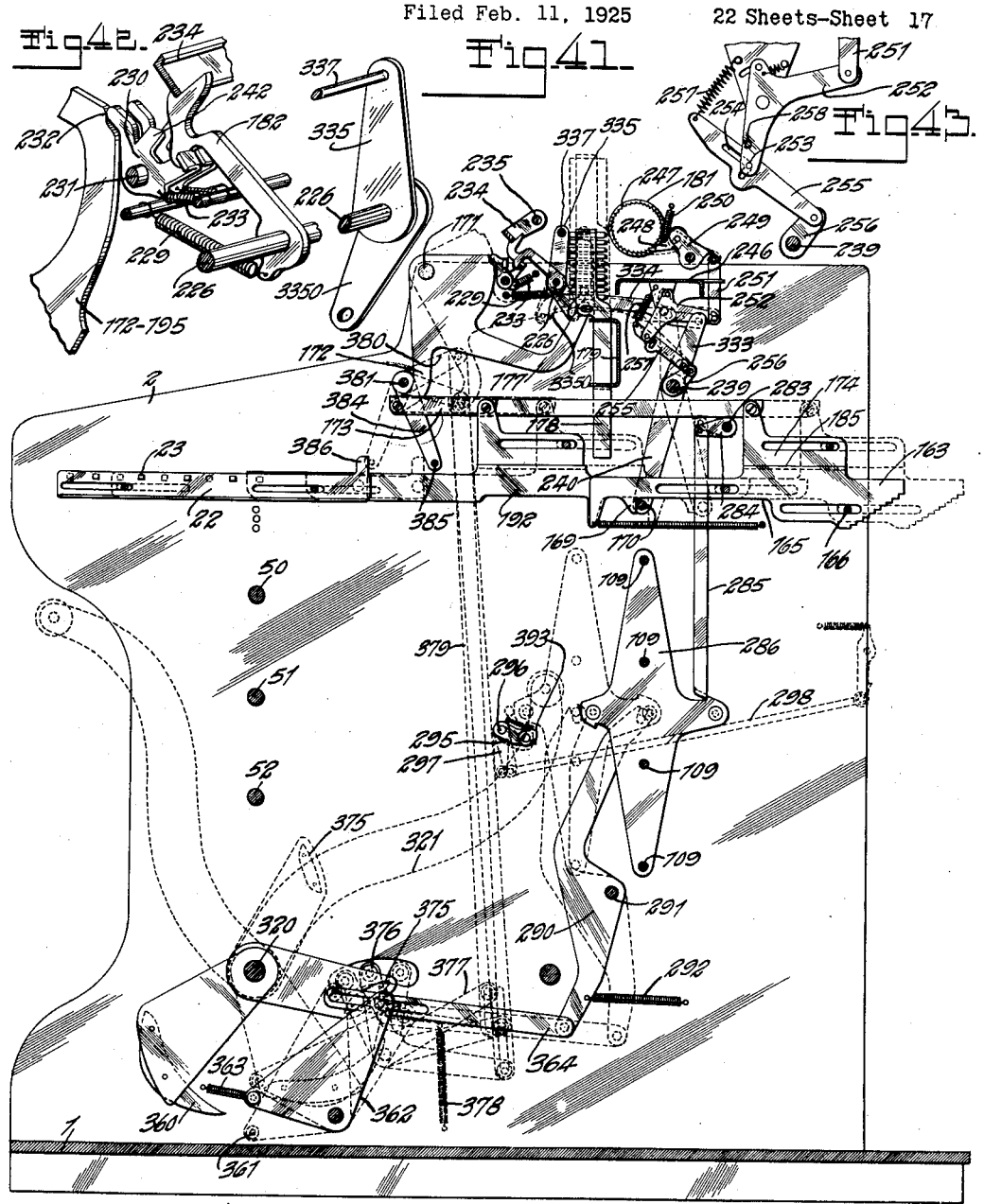
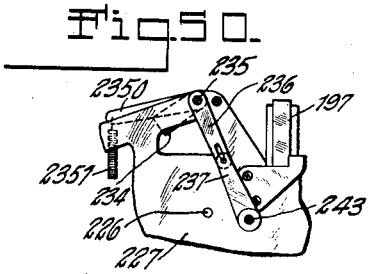
Inventors.
LUTHER A. WATTERS, ADOLF BAUMANN.
AND CARL P. HORLACHER
Attorney.

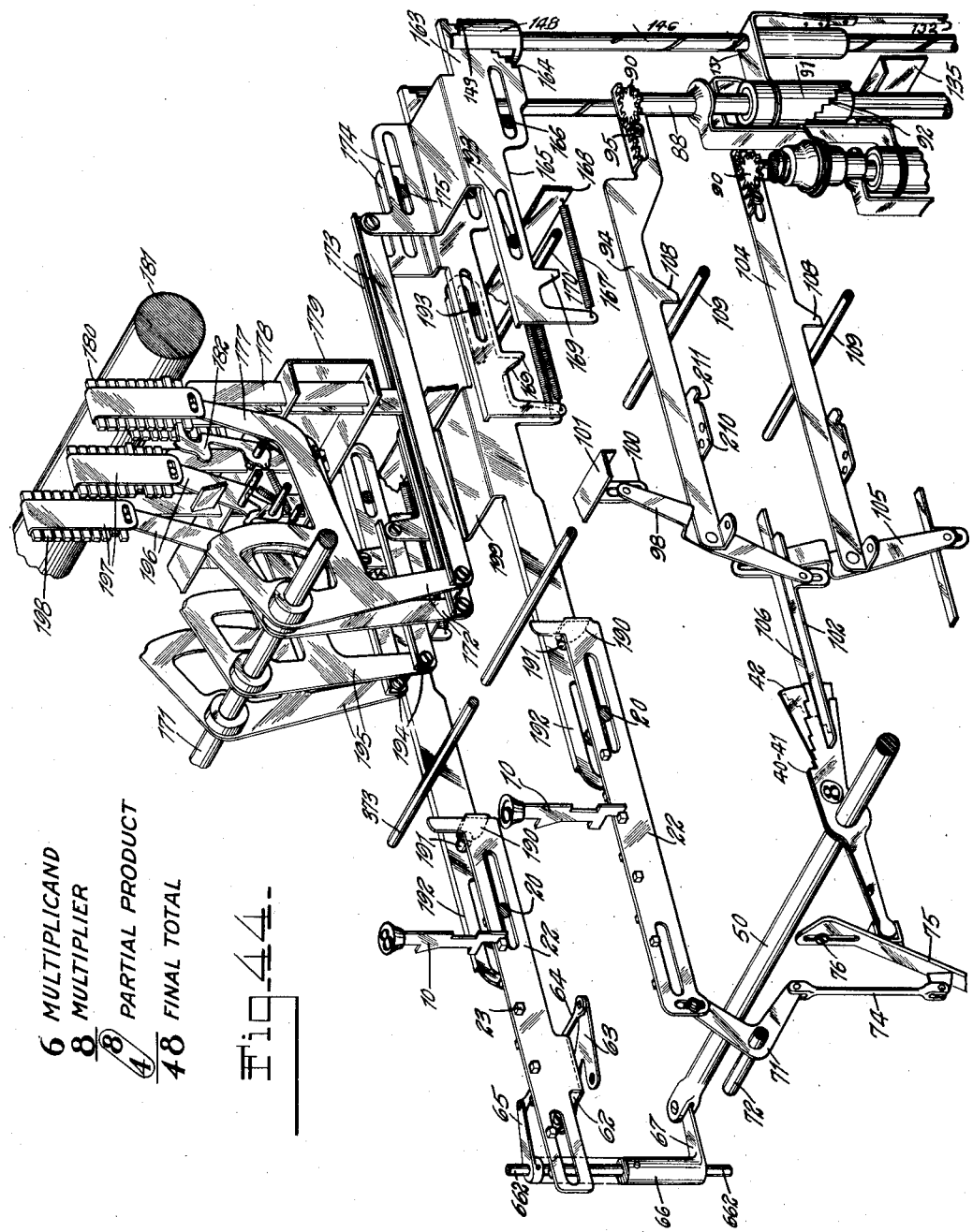

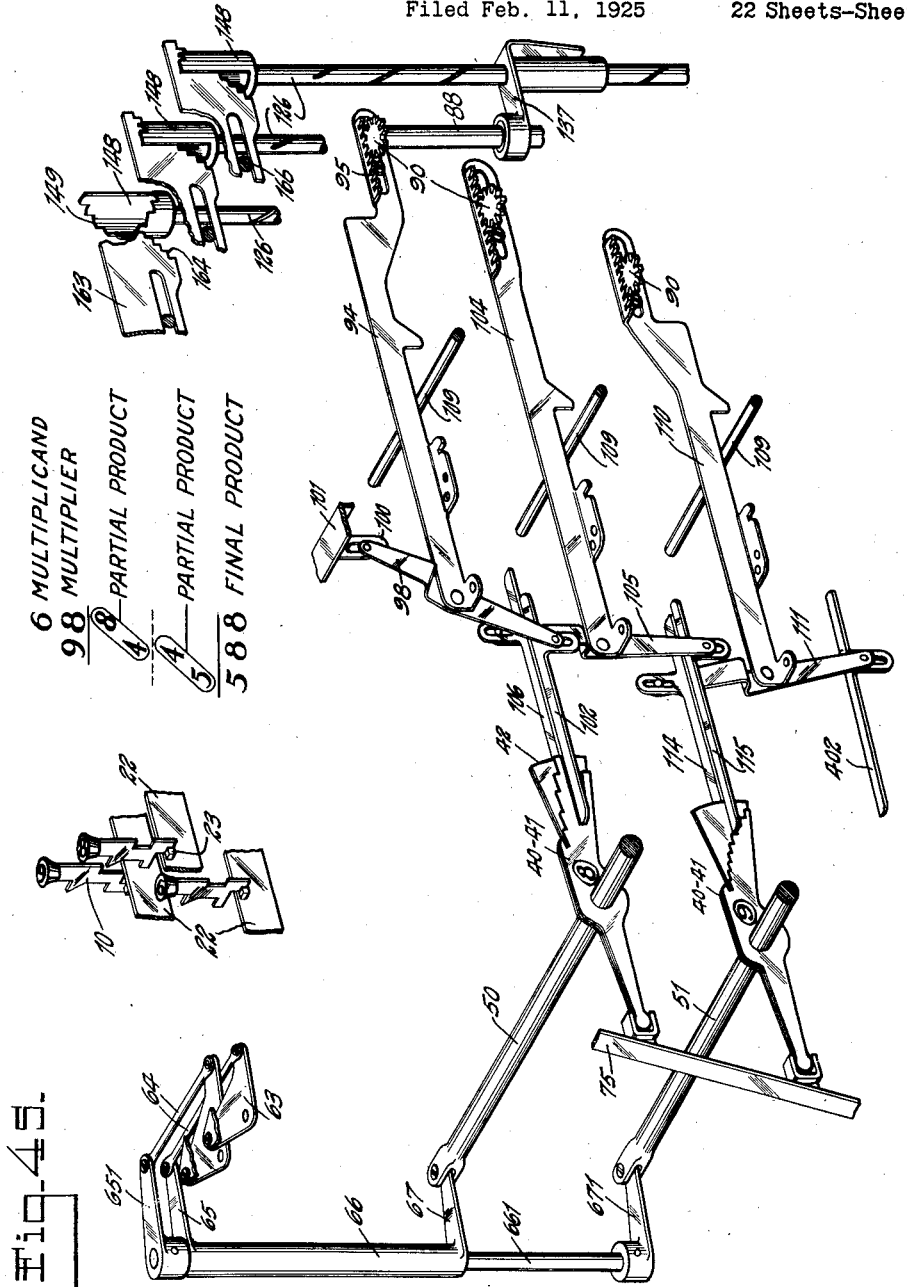

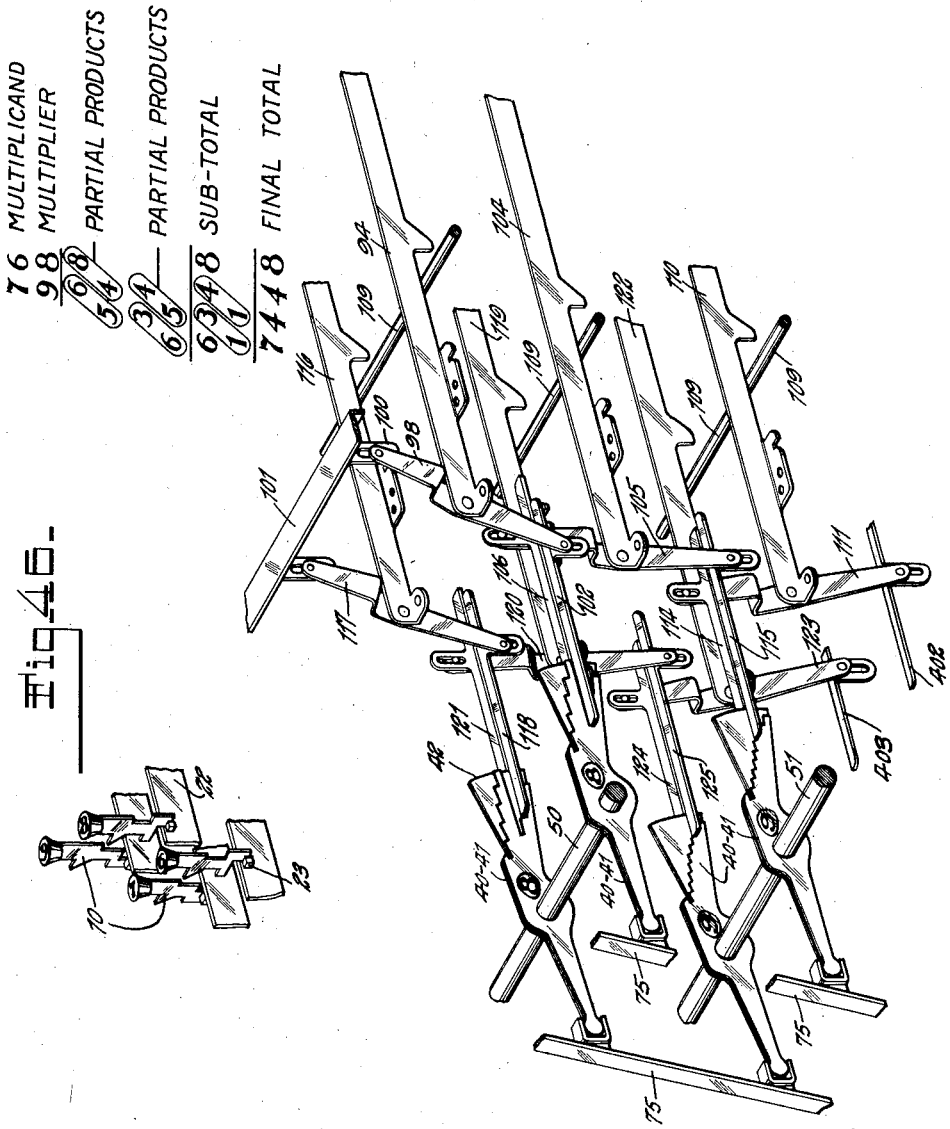

Dec. 29, 1931.   L. A. WATTERS ET AL   1,838,647
CALCULATING MACHINE
Filed Feb. 11, 1925    22 Sheets—Sheet 21
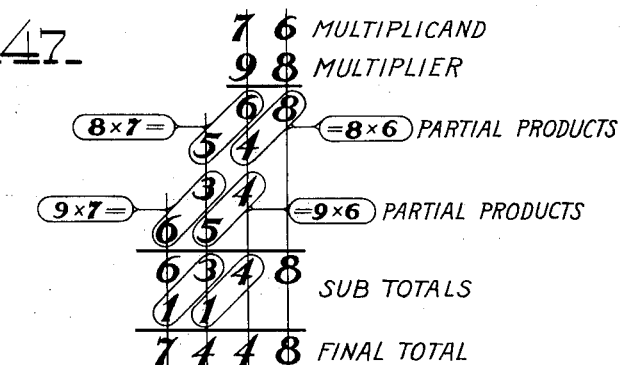
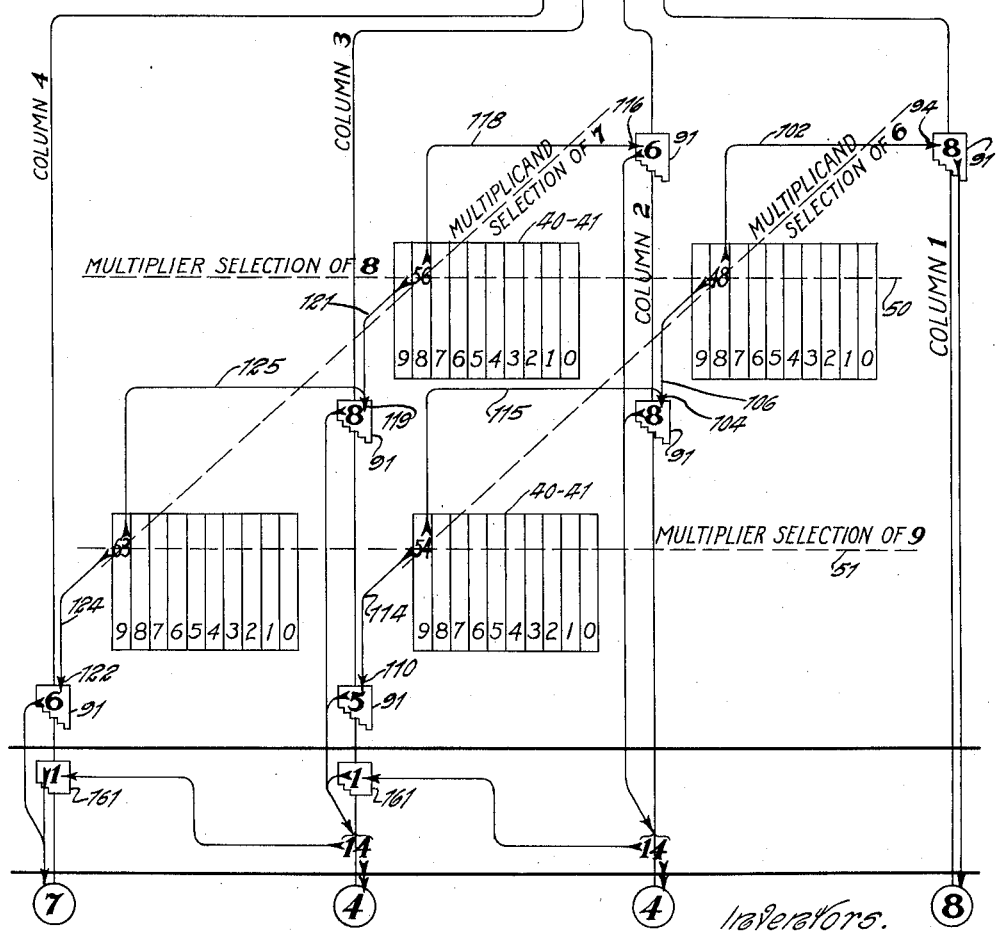

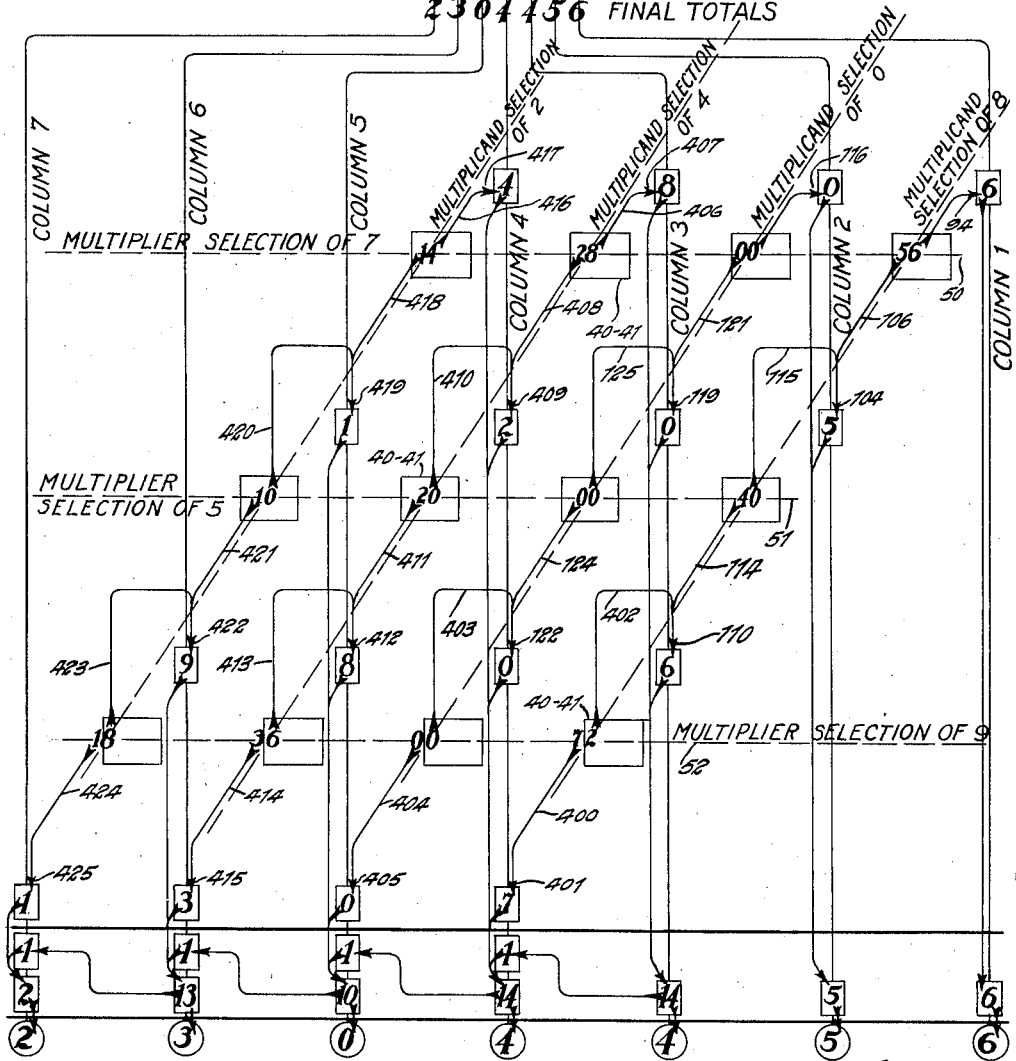

Patented Dec. 29, 1931

1,838,647

UNITED STATES PATENT OFFICE

LUTHER A. WATTERS, ADOLF BAUMANN, AND CARL P. HORLACHER, OF ST. LOUIS, MISSOURI, ASSIGNORS TO UNITED ACCOUNTING MACHINES, INC., OF WILMINGTON, DELAWARE, A CORPORATION OF DELAWARE

CALCULATING MACHINE

Application filed February 11, 1925. Serial No. 8,487.

This invention relates to calculating machines, and more particularly to machines adapted to perform the operation of multiplication. This application is a continuation in part of application Serial No. 683,651, filed December 31, 1923, as to common subject matter.

In the process of multiplying mechanically, difficulty is experienced in accurately setting the designating means so as to properly indicate or record the product.

One of the objects of this invention, therefore, is to provide means whereby the partial products are set into receivers arranged in banks, which in turn set the designating means, so that the final product is accurately and positively set into the latter.

Difficulty is also experienced in carrying the excess of accumulation of one order to the next higher order; this is due not only to the fact that the carrying is from a number of orders simultaneously but is also due to the fact that the excess may and frequently does exceed two steps or units, in fact in some cases the excess may be as high as eight units. Accordingly if it is attempted to accumulate the partial products in an ordinary counter provided with carrying mechanism it is necessary that the carrying elements be actuated to such an extent as to result in error even if overthrow preventing devices are provided. Similarly on account of the great accumulations which are required in adding the partial products, especially where a number of digits of the multiplicand and multiplier are great as is frequently the case, it is impractical to add these directly into ordinary counting mechanism provided with carrying mechanism, on account of the large number of revolutions which the individual counter elements as well as the carrying elements must execute, for errors are liable to result even if efficient overthrow preventing devices are provided.

Another object of this invention, therefore, is to provide means whereby the excess is accurately transferred to the next higher order, irrespective of the number of transfers and irrespective of the number of steps or units. More particularly the excess is transferred to a receiver of a higher order while the settings of the receivers in each bank, including the setting of the carrying receiver, are condensed so as to produce the digits of the final products at the terminals of the respective banks.

In the process of multiplying mechanically, difficulty is also experienced in properly accumulating the partial products, especially where these partial products result from the multiplication of a multi-digit multiplier and a multi-digit multiplicand.

Another object of this invention, therefore, is to provide mechanism adapted to properly segregate and accumulate these partial products in order to properly set the final product into the proper designating means.

In the process of multiplying mechanically, the products should be capable of being checked up with the multiplier and the multiplicand and these items should be set up and maintained in a definite and fixed relation.

Another object of this invention, therefore, is to provide lasting means adapted to coordinate the operations of the designating means for the multiplier and the multiplicand on one hand and for the product on the other hand, so that the designations of the former are maintained during the designation of the latter.

Another object of this invention is to provide novel segregating and integrating or accumulating means which is constructed and arranged to work positively and accurately and without liability of overthrow.

Further objects are to improve the machine as to details in order to secure mechanism which is simple in construction and effective and reliable in operation and economical to manufacture.

Further objects will appear from the detail description taken in connection with the with the accompanying drawings, in which:

Figure 1 is a plan of a calculating machine embodying this invention;

Figure 2 is a front elevation;

Figure 3 is a rear elevation;

Figure 4 is a detail perspective view showing the mounting of the bars for transferring accumulated readings to the recording mechanism;

Figure 5 is a side elevation, taken from the right side of the machine, Figure 1;

Figure 6 is a side elevation, taken from the left side of the machine, Figure 1;

Figure 7 is a longitudinal vertical section on the line 7—7, Figure 1;

Figure 8 is a detail showing the equalizing connection for an element of the segregating mechanism;

Figure 9 is a detail showing the guide for the set-up elements;

Figure 10 is a detail showing the support for the setting up elements;

Figure 11 is an end elevation of Figure 10;

Figure 12 is a detail plan, somewhat diagrammatical in its nature, of the key controlled bars and connecting mechanism, some of the key shanks being shown in section and other keys being shown in plan;

Figure 13 is an enlarged detail of Figure 7;

Figure 14 is a section on the line 14—14, Figure 1;

Figure 15 is a detail of Figure 14, showing one of the key latches;

Figure 16 is a detail of Figures 13 and 14 showing one of the latches for the key controlled bars;

Figure 17 is a detail plan showing one of the connections from the multiplier bar to one of the partial products setting-up devices;

Figure 18 is a detail showing the means for locking the segregating mechanism;

Figure 19 is a detail of Figure 12 showing the means employed for controlling the locking devices of Figure 18 from the key actuated bars;

Figure 20 is a view showing the different elements of a set of partial products setting-up devices;

Figure 21 is a section on the line 21—21, Figure 20;

Figure 22 is a front view of the integrating and accumulating mechanism;

Figure 23 is a section on the line 23—23, Figure 22 showing the segregating and accumulating mechanism for the first bank;

Figure 24 is a plan of Figure 23;

Figure 39:
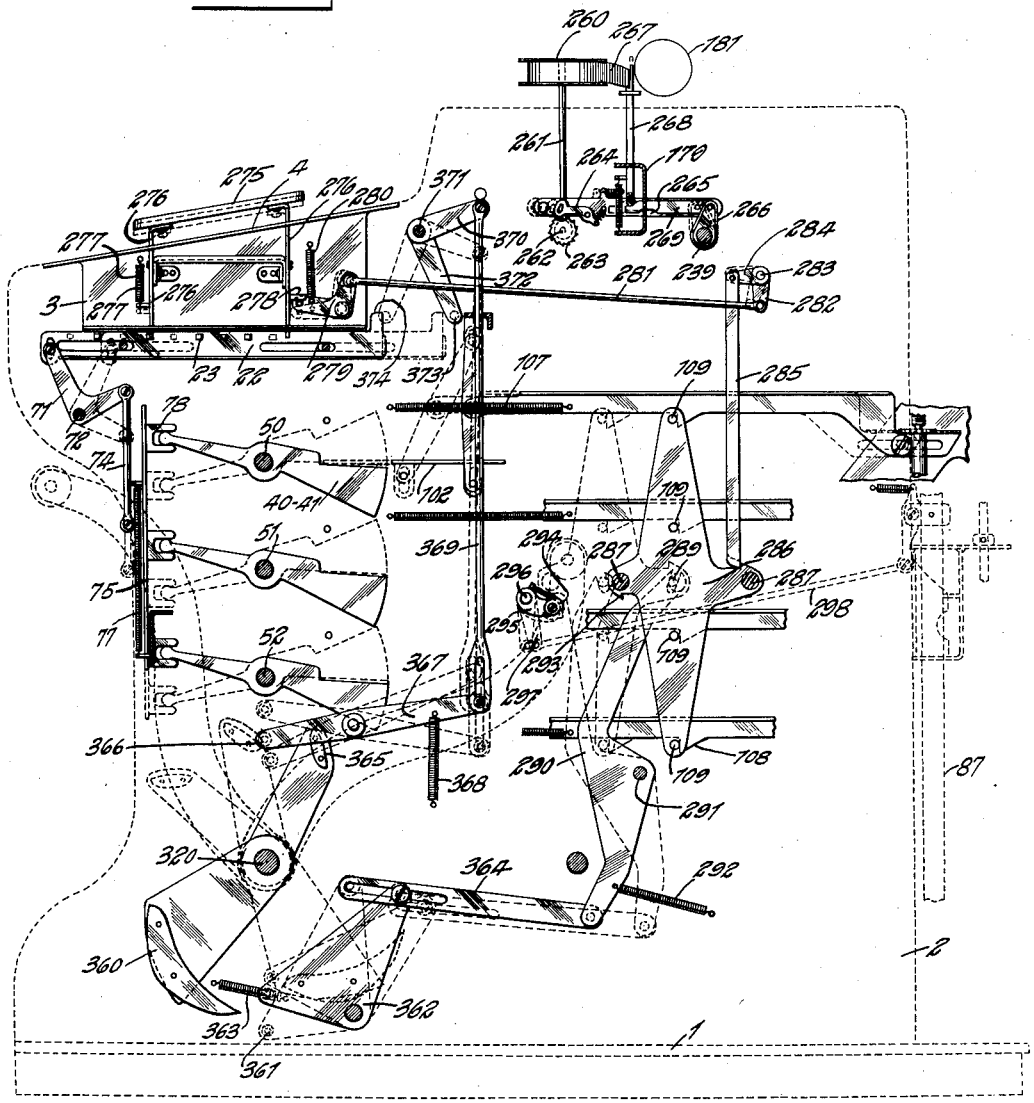
Figure 40:
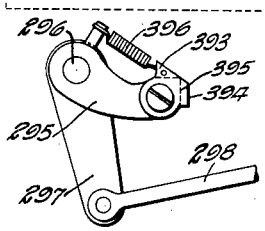

Figures 25 and 26, 27 and 28, 29 and 30, 31 and 32, 33 and 34, 35 and 36 are views similar to Figures 23 and 24 respectively, showing the segregating and accumulating mechanisms for the second, third, fourth, fifth, sixth and seventh banks, the sections being taken along the corresponding lines, Figure 22;

Figure 37 is a section along the line 37—37, Figure 22 showing the carrying mechanism;

Figure 38 is a perspective view of the carrying mechanism;

Figure 39 is a detail of the actuating mechanism and of a part of the resetting and clearing mechanism;

Figure 40 is a detail of Figure 39;

Figure 41 is another view of the resetting and clearing mechanism;

Figure 42 is a detail perspective showing the control of the hammers;

Figure 43 is a detail of the paper feed;

Figure 44 is a detail perspective view, somewhat diagrammatical in form, showing mechanism to obtain and print the product resulting from the multiplication of a single digit multiplicand and a single digit multiplier, and showing also mechanism for printing or listing the multiplicand and the multiplier in coordination with the product;

Figure 45 is a view similar to Figure 44 but showing mechanism sufficient to obtain the product resulting from the multiplication of a single digit multiplicand and a two digit multiplier;

Figure 46 is a view similar to Figure 45 showing sufficient setting-up devices and connections for obtaining the product resulting from the multiplication of a two digit multiplicand and a two digit multiplier;

Figure 47 is a diagrammatical view showing the arrangement of parts of Figure 46;

Figure 48 is a view similar to Figure 47 but showing the arrangement of parts sufficient to obtain the product resulting from the multiplication of a four digit multiplicand and a three digit multiplier;

Figure 49 is a view of the paper strap showing the coordinate listing of the product and of the multiplier and multiplicand and Figure 50 is a detail of the hammer latching mechanism.

*General description*

The machine comprises, generally stated, a number of mechanisms and their coordinating connections as follows:

Selective manipulative mechanism;
Partial products setting-up devices;
Segregating mechanism;
Integrating or accumulating mechanism;
Designating or printing mechanism;
Actuating and setting mechanism; and
Resetting or clearing mechanism.

The selective manipulative mechanism in the particular embodiment illustrated is in the form of a key board consisting of two sections, namely a multiplicand section and a multiplier section, and each section embodies a series of banks of keys corresponding to the digits of a decimal system. Accordingly there can be set up on the key board a multi-digit multiplicand and a multi-digit multiplier. By manipulation of the keys, a suitable connected mechanism is operated in order to control the multiplier and multiplicand setting-up devices, as hereinafter described.

The partial products setting-up devices consist of a series of banks or sections of stop plates, each of which is suitably formed to set up the partial products resulting from the multiplication of selected multiplicand and multiplier digits. These setting up devices are controlled by the keys as heretofore described so that upon setting up on the key board of a multi-digit multiplicand and a multi-digit multiplier, the partial products will be set up by the setting-up devices and these partial products so set up are taken and segregated in a manner hereinafter to be described.

The segregating mechanism comprises a series of receiving elements together with setting connections to the setting-up devices. These receiving elements are arranged in banks in accordance with the orders of the final product and the connections to the setting-up devices are such that the resulting partial products are set into the receiving elements.

Accordingly these partial products will be segregated so as to separately assemble the digit settings of the same order in the same group or bank in order that the settings of the several groups of banks may be accumulated as hereinafter described.

The accumulating or integrating mechanism is arranged to accumulate the settings of the several banks or assemble and set them into the registers or recorders for the final product. In order to accomplish this, mechanism is provided for integrating the settings in each of the several banks, while the excess accumulated setting of one bank is transferred or set into the next higher bank.

In accordance with one embodiment of this invention, a series of receivers are arranged in banks corresponding to the orders of the final product and connections from the partial product setting up devices lead to the receivers in order to segregate and set the partial products therein in accordance with their proper orders. Receiver banks of higher orders are each provided with a carrying receiver cooperating with the receivers in that bank and are arranged to take the excess from the bank to lower order. Means are provided for condensing the settings of the receivers in each bank, including the setting of the carrying receiver therein, so as to produce the digits of the final products at the terminals of the respective banks. The final product can then be taken from these accumulating or product taking elements at the terminals of the banks and set directly into any suitable designating or printing means without requiring further carrying.

The designating or printing mechanism comprises indicating and printing means which are arranged to be set by the receiving elements in order to designate or print the final product. In addition to designating or printing means for the final product, means are provided for designating or printing the multiplicand and the multiplier. These several designating or printing means are, however, so coordinated as to be inter dependent so as to insure the designation of the product corresponding to the designation of the multiplier and the multiplicand. Accordingly means is provided operating upon setting of the multiplicand and multiplier setting up devices to not only designate the multiplier and the multiplcand but also the corresponding product and the connections are maintained while the product is being taken.

In accordance with one embodiment of this invention, a platen is provided adapted to receive a record strip, and printing devices cooperate with this platen and are adapted to print the multiplicand and multiplier and the resulting final product in listing relation on the strip. The multiplier and multiplicand printing devices are set by the selective manipulative means, namely, the keys, while the product printing device is set by the accumulating means and more particularly the product taking elements at the terminals of the receiver banks. Operating means is provided, adapted to automatically and as an incident to the actuation of the product printing device, to actuate the multiplicand and multiplier printing devices. Upon actuating of the machine, the multiplicand and multiplier printing devices as well as the product printing device are set and these settings are maintained until the machine is cleared, so that these items are printed in listed relation.

Suitable mechanism is, of course, provided for effecting the coordination of the several mechanisms and for securing operation of the printing mechanism as well as for securing clearing of the machine.

*Preliminary description*

Referring to Figures 1, 2, 3, 5, 6 and 7, the machine generally stated comprises a base 1 on which are mounted side plates 2. On these side plates and therebetween and on this base is mounted the mechanism for securing the result, and suitable supports are provided for the various mechanisms as will hereinafter be more fully described. In the actual machine there will be provided a cover as usual in machines of this type, but this cover has been omitted in order to expose the working mechanism.

In the accompanying drawings and the detail description applying thereto there is specifically shown and described in detail a machine for obtaining the product resulting from the multiplication of a four digit multiplicand and a three digit multiplier. It will, however, be understood that this description is simply illustrative for by the addition of proper units, the capacity of the machine may be increased to any desired extent and to any desired number of digits in both the multiplier and the multiplicand.

*Selective manipulative mechanism*

Referring to Figures 1, 2, 7, 12 to 17 inclusive and 44, and first more particularly to Figures 1, 2 and 14, it will be noted that the machine has two banks of keys, the bank on the left being in this embodiment the multiplier keys while the bank on the right are the multiplicand keys. In each bank the keys are arranged in column numbered from "1" to "9" inclusive corresponding to the nine digits of the numerical system, the "0" digit key being omitted since it is unnecessary. In the specific embodiment shown there are three columns of multiplier keys and four columns of multiplicand keys.

Referring to Figures 1, 2, 13 and 14, each bank of keys is mounted in a box-like carrier 3 preferably formed of sheet metal and having a slotted top 4 through which the key shanks project. The ends of the carrier have flanges 5 which rest on cross-pieces 6 and 7 connecting the sides 2 and removably secured thereto in any suitable manner so that each carrier with its column of keys may be removed and replaced as a unit. A division-plate 8 between the two banks has a flange 9 and is similarly mounted on and secured to the cross-pieces 6 and 7 and additional and similar plates 9 to the right of the multiplicand keys may also be mounted on and secured to the cross-pieces 6 and 7 in a similar manner.

The top 4 of the carrier 3 is slotted to receive the key shanks 10 which are all similar in construction and similarly mounted, except that the bottom tips of these shanks are somewhat differently formed as shown in Figure 14, these bottom tips, however, projecting through and being guided in slots in a bottom flange 11 of each carrier. Arranged in side of each carrier 3, and attached thereto is a bar 12 which is slotted to receive the key shanks and a spring 13 connected at its lower end to each key and at its upper end to the bar 12 serves to hold the key in raised position with a lug 14 thereon bearing against the bar 12. This lug 14 is provided with a cam face arranged to engage a latch 15, Figures 14 and 15, which extends along a column of keys and is engageable by all of the key shanks in that column and which is pressed against the key shanks by one or more springs 16 on the pivots 17 mounting this latch for swinging movement on the carrier 3.

Arranged below the banks of keys is a support 18 which is carried by a cross-piece 19, Figure 2, and on this support are flat bars 20 set on edge and grooved to provide bearings 21 taking into slots in bars 22, one of which is arranged below each column of keys, Figures 2, 13 and 14. Each of these bars has lugs 23 arranged to be engaged by the key shanks, these lugs being spaced on the bars as usual in calculating machines. Each bar 22 has a flange 24, Figure 16, which is notched so as to be engaged by a latch 25 guided in slots in bar 12 and lower flange 11 and normally held in the position shown by a spring 26. This latch has, however, a pin and slot connection with a cradle 27 pivoted in the carrier 3 and having a yoke 28 extending along the key shanks and within a recess in each so as to be engageable by a shoulder 29 on each key shank. The latch 25 has a recess 30 adapted upon depression of this latch to clear the flange 24 and permit the retained bar to move to the right, Figure 13, under the action of a spring as hereinafter described.

Upon the depression of any key in any bank, the key shank will be moved into the path of its proper lug 23 on the bar 22 therebelow, and thereafter this bar will be released so as to permit it to move to the right until arrested by engagement of the lug with the key shank tip. This key will then be held in depressed position by the latch 15 taking over the lug 14. It will furthermore be seen upon depression of any other key in the same bank, any depressed key will be released while the last depressed key will again be retained in depressed position.

*Partial products setting-up devices*

Referring now to Figures 1, 2, 6, 7, 9, 10, 11, 20, 21, 39, 44 and 45, the partial products setting-up devices comprise a series of groups of elements which for a machine of the capacity of a four digit multiplicand and a three digit multiplier has twelve groups of elements of ten each. The elements of the several groups, however, correspond so that a detail description of one group will apply to the others.

Referring now to Figures 20 and 21, which show a group of ten elements, it will be seen that each element has a pair of plates 40 and 41 separated by a division plate 42. These plates are perforated as shown at 43 to receive a shaft as hereinafter described, and they are securely fastened together to form an assembled element in any suitable manner as by rivets 44. The extension of the element beyond the shaft 43 is further provided with a rounded head 45 which is arranged to couple with a cooperating part as hereinafter described. The plate 40 of each element has a stop face 47 while the part 41 is also provided with a stop face 48.

Upon reference to Figure 20 it will be noted that each element represents a digit of a multiplier, the elements having marked thereon by numbers enclosed in circles the several digits represented by these elements. Each element is, however, arranged to occupy ten positions corresponding to the ten digits of a numerical system, the "0" position being, however, represented by the extreme edge of the element which as hereinafter described, is really inactive. The angular positions of the elements correspond to the digits of the multiplicand. Accordingly the stops 47 and 48 will correspond to the partial product resulting from the multiplication of any selected multiplicand by any selected multiplier. Thus, in referring to the multiplier element "8", it will be seen that the stops 47 and 48 in the sixth position correspond respectively to "4" and "8" which represent the partial product resulting from the multiplication of "8" by "6". An inspection of Figure 20 generally will show that this relation holds true. In accordance with this invention, therefore, when it is desired to obtain the partial product resulting from the multiplication of any selected multiplicand and the multiplier, the proper multiplier element is selected and this element is then shifted to a position corresponding to the digit of the multiplicand; as a result, the stops will set up the partial product.

As shown in Figure 2 there are a series of groups of these elements arranged in the machine, each group containing a series of ten elements arranged in assembled relation with the "0" element at the right and the "9" element at the left. Arranged to slide in bearings in the sides 2 are a series of shafts 50, 51, 52 corresponding respectively to the three digits of the multiplier and each of these shafts is connected for setting by a bank of multiplier keys reading from right to left, Figure 1. Each shaft has mounted thereon groups corresponding in number to the column of keys in the multiplicand bank, and each group is controlled by its corresponding bank, Figures 1 and 2. It is necessary to secure the groups of elements against endwise movement on their respective shafts 50, 51 and 52 while permitting oscillation of these elements on their respective shafts. In order to accomplish this purpose each shaft has mounted thereon a cradle 53, Figure 10, having side pieces 54 through which the shaft passes and engaged by collars 55 fixed to the shaft. There may also be similar collars between the groups, Figure 10. In order to brace the ends of the elements against lateral displacement, the cradle has depending guides 56 connected at their bottoms by braces 57. The rounded ends 45 of the elements move in guides 58, Figure 9, on the cross-pieces 19, 59 and 60, Figure 2; these cross-pieces are slotted as shown at 61, Figure 9, and the guides 58 interrupted for a purpose to be hereinafter described.

Each of the multiplier bars 22, Figures 2, 6, 17, 44 and 45, is connected to shift a shaft 50, 51 or 52, the units bar (first from the right, Figures 2 and 12) being connected to shift the unit shaft 50, the tens bar the tens shaft 51, and the hundreds bar the hundreds shaft 52. The connections are, however, similar, except as hereinafter described, and a detail description of one will, therefore, be sufficient.

As shown in Figures 17 and 44, the bar 22 has a bracket 62 which is slotted to engage one arm of a bell crank lever 63 mounted on the plate 18 and connected by a link 64 to an arm 65 fixed to a rock shaft 66 on the side 2, which rock shaft has fixed thereto an arm 67 connected with the shaft 50. The shaft 50 (as well as the shafts 51 and 52) is tensioned to move to the right, Figures 2, 17 and 44, by a spring 68 connected at one end to a cradle 53 and at its other end to the side 2. It will, therefore, be seen that upon depression of any key in, for instance, the units multiplier bank, the shaft 50 will be moved to the right, Figure 2, to an extent corresponding with the digit of the depressed key.

Figure 6:
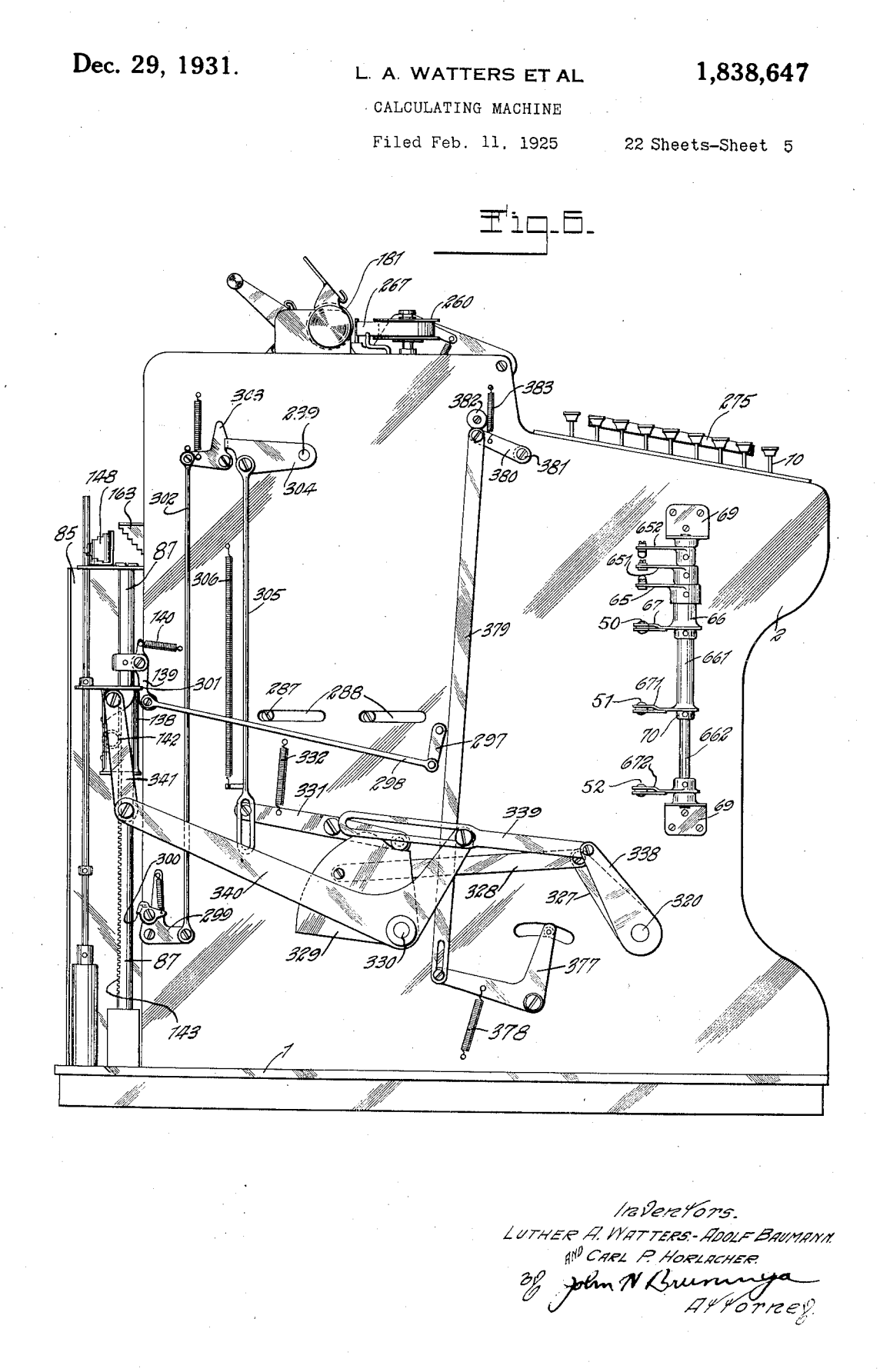

The connection from the tens multiplier bar 22 to the shaft 51 and the connection from the hundred multiplier bar 22 to the shaft 52 are similar to those previously described, and a detail description will, therefore, be unnecessary. In order, however, to mount all the shafts on the side plate 2, they are arranged in nested relation as shown in Figure 6, in which figure the tens and hundreds shafts have been indicated by 661 and 662 respectively, the tens and hundreds arms by 651 and 652 respectively, and the tens and hundreds arms connected with the shafts 51 and 52 by 671 and 672 respectively. The shaft 662 is mounted in bearing brackets 69 on the side 2, the shaft 661 is nested on shaft 662 and retained by a collar 70, and the shaft 66 is nested on 661 and retained thereby.

Each of the cross-pieces 19, 59 and 60 is provided with a series of slots 61, Figure 9, one for each group of elements 40, 41, and in the normal position of parts, the "0" elements of each group is positioned in alinement with its corresponding slot, the shafts 50, 51 and 52 being maintained in position to cause such registration by the latches 25 coperating with the bars 22, Figures 13 and 16. However, upon depression, for example of the "8" multiplier key in the units column, the latch 25 will be moved to release the units bar 22 so as to cause this bar to be arrested in its eighth position. This will cause the shaft 50 to be shifted so as to locate all of the "8" elements in all of the groups on shaft 50 in alinement with their slots 61.

Each multiplicand bar 22 has a pin and slot connection with a bell crank lever 71, Figures 2, 7, 13, 39 and 44, mounted on a shaft 72 carried by brackets on the cross-piece 19. The bell crank levers 71 are held in proper spaced relation by collars 73. Each bell crank lever 71 is connected by a link 74 with a slide 75 guided on cross-pieces 19 and 60 by studs 76 engaging slots in the slides, and each of these slides is under the tension of a spring 77 connecting the same with the cross piece 60 so as to move it down when released. Each slide 75 is arranged to slope down from right to left corresponding with the positions of the slots 61 and the groups of elements on the shafts 50, 51 and 52, and has U-shaped couplings 78 working in the slots 61 and normally in engagement with the "0" elements. These couplings 78 as well as the slots 61 are of substantially the same width as an element 40, 41 and the ends of the guides also clear these slides and couplings. Accordingly when any slide 75 is moved down it will swing all of the stop elements 40, 41 in alinement therewith. Now these slides are moved to extents corresponding to the digit of a depressed multiplicand key, for upon depression of any multiplicand key, such as the "6" key in the unit column, the unit bar 22 after having been released will move to the sixth position, thereby swinging the coupled element 40, 41 to the sixth position. It will also be noted that the unit slide 75 swings all of the elements coupled therewith on the shafts 50, 51 and 52. From the above description it will be seen that the depression of any multiplier key will shift the groups of stop elements 40, 41 of the same order to an extent determined by the digit of the depressed key, and that the stop elements corresponding to the digit of the depressed key are free to be oscillated while all other stop elements are retained against oscillation by the guides 58, Figure 9. The stop elements of the several groups are, however, alined with the couplings so as to be shifted angularly to positions corresponding to the digits of the multiplicand upon depression of the keys in the multiplicand banks.

Let us assume that the multiplier keys "9" and "8" have been depressed so as to shift the units and tens groups on shafts 50 and 51 with the proper stop elements alined with the couplings 78 on the units and tens slides 75, Figures 2 and 46. This will couple the "8" stop element of the unit group (right, Figure 2) on shaft 50 and the "9" stop element of the unit group on shaft 51 with the couplings 78 on the unit slide (right, Figure 2); the "8" stop element of the tens group (second from right, Figure 2) on shaft 50 and the "9" stop element of the tens group on shaft 51 will, however, also be coupled to the tens slide 75. Accordingly upon depression of the "7" and "6" multiplicand keys, which causes the unit slide 75 to be depressed to the sixth position and the tens slide 75 to the seventh position, the "8" and "9" stop elements of the units group on shafts 50 and 51 respectively will be shifted to the sixth position while the "8" and "9" stop elements of the tens group on these respective shafts will be shifted to the seventh position. Accordingly these shifted stop elements will set up partial products as follows: In the units group on shaft 50, the partial product "48"; the units group on the shaft 51 the partial product "54"; in the tens group on the shaft 50 the partial product "56"; and in the tens group on the shaft 51 the partial "63"; this is shown in Figures 46 and 47. The partial product so set up can now be segregated and accumulated as hereinafter described.

*The segregating mechanism*

Referring to Figures 1, 3, 6, 8, 22 to 37 inclusive, 39, 44, 45 and 46, mounted on the base 1, Figures 3 and 22 are a series of brackets 85 which are suitably flanged to provide for strength and which are connected at their tops by a strip 86 which also bridges a pair of vertically arranged guides 87 also mounted on the base 1. These brackets 85 are of varying depths increasing from right, Figure 22, to the center and hence decreasing to the left end. See also Figures 23 to 37 inclusive. Each of these brackets 85 has mounted thereon one or more shafts 88, each of which has a pivot bearing at its ends in brackets 89 and each of which has fixed thereto at its upper end a pinion 90 and has splined thereon a receiver 91. This receiver comprises a cup-shaped structure which has a series of circumferentially and axially spaced stops 92 arranged to engage with a suitable index or finger, one of which is shown at 93, Figure 23. These shafts and receivers are arranged in banks or columns and increase from the single receiver in the first bank or column, Figure 23, to four in the fourth column, Figure 29, and hence decrease again to a single shaft and receiver in the seventh column, Figure 35.

Referring now particularly to Figures 23 and 44 and also to Figures 7 and 39, the pinion 90 has meshing therewith a rack on a link 94 provided with a guide slot working over a stud 95 on the support 85. This link extends forwardly and slides at its forward end on a cross-piece 96 mounted on the sides 2, Figures 7 and 8, being guided thereon by a stud 97 working in a slot in the cross-piece 96. To the forward end of this link 94 is pivoted a lever 98. The upper arm of this lever has a pin and slot connection with a lug 100 on a cross-bar 101 mounted on the sides 2, while the lower end of the lever has a pin and slot connection with a finger 102 guided for movement on a cross-piece 103 also mounted on the sides 2, by a stud 99 on the cross-piece engaging a slot in the finger, (Figure 7).

Referring to Figures 25 and 44, the pinion 90 on one of the shafts 88 meshes with a rack on a link 104 similar to 94 and similarly supported, guided and connected at its forward end with a lever 105 whose upper end has a pin and slot connection with a finger 106 similar to the finger 102 and similarly guided and supported, while the lower end of the lever may for the present be considered as fixed in space.

The links 94 and 104 are moved to the left, Figure 44, by springs 107, Figures 7 and 8, connecting the respective links with lugs on the cross-pieces 96. The fingers 102 are slightly spaced so as to bridge the part 42 of a stop element in order that the finger 102 may be in a position to engage the stops 47 corresponding to the units of the partial product, while the finger 106 is in a position to engage the stops 48 representing the tens of the partial product resulting from the multiplication of a single unit multiplicand and a single unit multiplier, Figures 20 and 44. These fingers 102 and 106 are, however, normally held in retracted position so that the tips thereof will just clear the face 47, Figure 20, of the "0" stop element. Accordingly these fingers are normally in a "0" position with the "0" stops 92 on the receivers 91 opposite the indices 93, Figures 23 and 25. These fingers are held by lugs 108, Figures 7, 39 and 44, on the links 94 and 104 engaging cross-bars 109, which cross bars are normally held in full line position, Figure 39.

Assuming that the multiplicand key "6" and the multiplier key "8" have been depressed as shown in Figure 44, this will cause the "8" stop element of the units group to be shifted in proper cooperation with the stop fingers 102 and 106 and to the sixth position, thereby setting up the partial product "48". Upon release of the cross bars 109, the springs 107 will move the links 94 and 104 and the connected fingers 102 and 106 until they are arrested respectively in the "8" and "4" positions. This will cause the receiver in the first bank or column, Figure 23, to be shifted to the eighth position while the first receiver in the second column, Figure 25, will be shifted to the fourth position, thereby setting up in the respective banks the final total "48". This final total can be transmitted to the indicating and recording mechanism as hereinafter described.

Referring now to Figures 27 and 45, the first receiver shaft has its pinion 90 meshing with a link 110 which is similarly constructed, guided, supported, tensioned and retained as the links 94 and 104 and which is connected at its forward end to a lever 111 similar to the levers 98 and 105. The lower end of this lever has a pin and slot connection with a finger 402 as hereinafter described, while the upper end of the lever has a pin and slot connection with a finger 114 similar to 106 and similarly supported and guided. It will also be noted that the lower end of the lever 105 previously described has a pin and slot connection with a finger 115 similar to 102 and similarly supported and guided. The finger 402 may for the present be considered as fixed. The lever 105 is a floating lever and it, as well as other floating levers hereafter described, is kept in an upright position by a spring 80 on its link connecting with an extension 81 on the lever (Figure 8).

Assuming that the item "98" has been set up on the multiplier keys and the item "6" on the multiplicand keys, it will be noted that while the fingers 102 and 106 cooperate with the "8" stop element of the unit multiplier bank, the stop fingers 114 and 115 will cooperate with the "9" stop element of the tens multiplier group. Furthermore the "9" stop element as well as the "8" stop element has been shifted to the sixth position. Accordingly while the partial product "48" is read by the fingers 102 and 106 and set into the first receivers 91 of the first and second columns, Figures 23 and 25, the partial product "54" is read by the fingers 114 and 115 and set into the first receivers of the second and third banks, Figures 25 and 27. Accordingly the "4" of the partial product "48" and the "4" of the partial product "54" are both set into the first receiver of the second bank. This is possible due to the fact that the lever 105 is a floating lever and that the link 104 is shifted by both of the fingers 106 and 115 which read respectively the "4" and "4" of the two partial products. Accordingly the final product "588" will be set up into the first receivers of the first three columns or banks and this final product can be transferred to the register and recording mechanism in a manner hereinafter to be described.

Considering now mechanism sufficient to obtain the final total of a two digit multiplicand and a two digit multiplier, we will refer to Figure 46 which shows such mechanism set for obtaining the final product "7448" resulting from the multiplication of the multiplicand "76" by the multiplier "98".

Referring first to Figure 25 in connection with Figure 46, the second receiver shaft pinion has meshing therewith a rack on a link 116 which is similar to the link 94 and similarly supported, guided and tensioned. This link is connected at its forward end with a lever 117 also having a pin and slot connection with the lug 100 on the cross-bar 101, while the lower end has a pin and slot connection with a finger 118 similar to the finger 102. This finger 118 cooperates with the units stop of the second stop element "8" on the shaft 50 and sets into the second receiver in the second bank the units "6" of the partial product "56".

Referring to Figure 27 in connection with Figure 46, the second receiver shaft in the third bank has its pinion meshing with a rack on a link 119 similar to the link 104 and similarly supported and tensioned. This link is connected at its forward end with a lever 120 similar to 105 and having a pin and slot connection with a finger 121 engaging the tens stop of the second "8" stop element so as to set into the second receiver of the third bank the tens of the partial product "56".

Referring to Figure 29 in connection with Figure 46, the second receiver shaft 88 has its pinion meshing with a rack on a link 122 similar to the link 110 and similarly supported, guided and tensioned and this link is connected with the lever 123 similar to 111 and having a similar pin and slot connection with a finger 403 like 402. The upper end of the lever 123 has a pin and slot connection with a finger 124 similar to 114 and engaging the tens stop of the second stop element "9" so as to set into the second receiver of the fourth column or bank, the tens of the partial product "63". The lever 120 like the lever 105 is a floating lever and is connected at its lower end with a finger 125 similar to the finger 102, and this finger 125 engages the unit stops on the second stop element so as to set into the second receiver in the third column the units of the partial product "63".

It will thus be seen that the partial products are not only set up in the receivers, but that they are also partially accumulated therein. Upon reference to the problem shown in connection with Figure 46, it will, however, be seen that while the partial products are segregated and set into the proper receivers in accordance with the orders of the partial products, and while, if the readings of the receivers in the several banks are accumulated, they will give the final product "7448" provided there is no carrying required; where, however, the sum of the readings or setting in any bank is in excess of "9" then the excess accumulation must be carried to the next bank as will be hereinafter more fully described.

*Integrating or accumulating mechanism*

Referring to Figures 1, 3, 7, 23 to 36 inclusive, 44 and 45, and more particularly to Figure 23, arranged in each bank is a shaft 126 which is mounted in bearings 127 and 128 at its upper and lower ends on the bracket 85, the upper bracket having a thrust bearing preferably of the anti-friction type. This shaft has a helical groove 129 therein engaged by a thread 130 in a nut 131 slidable along the shaft. This nut has connected therewith a strap 132 passing over a pulley 133 in the base 1 and connected to one end of a spring 134, the other end of which is anchored on the base. This spring when under tension tends to move the nut down on the shaft, but this nut is held in raised position by a cross-head 135 engaged by an adjustable stop 136 on the nut. This nut furthermore has a slotted part 137 engaging an annular groove in the receiver 91, so that while the receiver may rotate freely with the shaft 88 it is restrained against movement except with the nut.

Upon reference to Figures 25, 27, 29, 31, 33 and 35, it will be seen that each bank has a shaft 126 and a nut 131 thereon similarly connected with the adjacent receiver in the bank by a slotted part 137 and the nuts are also retained in position by the cross-head 135. This cross-head is connected at its ends to guides 138, Figure 22, sliding on the guides 87 and this cross-head is held in raised position by latches 139 pivoted on the guides 87, Figures 5 and 22, and engaged by springs 140. When, however, the latches are released, the cross bar can move down until arrested by rubber bumpers 183. Dash pots 184 are also provided, the plungers 185 of which are connected with the cross-head. The cross-bar carries a shaft 141 provided at its ends with pinions 142, Figures 5 and 6, fixed thereto and meshing with racks 143 on the guides 87 in order to retain the ends of the cross-head in proper alinement.

Upon referring to Figures 25, 27, etc., it will be noted that where there is more than one receiver in a bank then these receivers are connected by connecting-members 144, each of which is slotted at its lower end to take into an annular groove in the next lower receiver, while the upper end of the connecting member has a perforated head 145 taking over the higher receiver. By means of this connection the next lower receiver must move upwardly with the next higher receiver, but the next higher receiver may move downwardly freely since the head 145 simply bears on the top of the receiver. It will also be noted that the indices 93 are mounted on these straps. This is also true of the end receivers in which the strap 146 has a cap 147 simply taking over the top of the receiver so that the index 93 will be carried up with the receiver while this receiver can move freely downward with respect to its index.

The top of each shaft 126 has a head 148 which is hollow and is stepped around its upper edge as shown at 149. There are ten steps for a numerical system. Furthermore the pitch of the slot 129 is such that when the nut 131 moves down a distance equal to the vertical spacing of ten receiver steps 92, then the shaft 126 and the head 148 will pass through a complete revolution. In the normal position of the nuts 131, the heads 148 will be in a position with their "0" stops 149 in a predetermined position as hereinafter described. These steps may, therefore, be numbered as shown in Figures 38, to provide indicating means. The heads 148, therefore, form product taking elements which, as they are located at the terminals of the receiver banks, not only take but even designate the digits of the final product. This final product can, therefore, be taken from these heads and transferred to any suitable designating or printing mechanism as hereinafter described.

Assuming the partial products set up and segregated in the receivers in accordance with the problem noted in connection with Figure 46, the receivers 91 will then stand with their steps 92 with respect to their indices 93 in the following relation: In the first column, Figure 23, the receiver will stand at "8"; in the second column, Figure 25, the first receiver at "8" and the second at "6"; in the third column, Figure 27, the first receiver at "5" and the second receiver at "8"; and in the fourth column, Figure 29, the second receiver at "6". If now the latches 139 supporting the cross-head 135 are released, the nuts 131 in these several columns will move down carrying the receivers with them and these receivers will successively be arrested by their indices after having moved to positions to engage their steps with their indices. Of course, those receivers which have not been moved will not permit any shifting of the nuts so that there will be no shifting in the fifth, sixth and seventh columns. The total movement of the nuts in the several columns will, therefore, be as follows: First column eight steps; second column eight steps on the first receiver and six steps on the second receiver or a total of fourteen steps; third column five steps on the first receiver and eight steps on the second receiver or a total of thirteen steps; fourth column six steps. It will, therefore, be seen that the heads 148 are shifted in accordance with the accumulations of the settings in any bank, and these settings are condensed and added. The heads 148 will, therefore, indicate the final total provided no carrying is necessary, that is, provided the total accumulations in any bank do not exceed "9". Where, however, this is not true then carrying mechanism must be provided as will now be described.

*Carrying mechanism*

Referring to Figures 37 and 38 in connection with Figures 23 to 36 inclusive, it will be noted first that no carrying is required in the first bank since the total readings in the first bank never exceed 9. In the second bank, however, there must be carrying mechanism to the third bank.

Referring now to Figures 25, 26, 37 and 38, it will be seen that the shaft 126 has fixed thereto an element 150 of a Geneva movement, the cooperating element 151 of which is mounted on a shaft 152 having a bearing in the bracket 128 and having fixed to its lower end a pinion 153 meshing with a rack 154 on a slide 155 guided in the bracket 85 by studs 156 working in slots in the slide. This slide 155 passes from one side of the bracket 85 to the other side thereof so as to work in the next bank, Figure 27, and it has a rack 157 meshing with a pinion 158 on a shaft 159 supported at its ends in brackets 160 and having splined thereto a carrying receiver 161 similar to the receivers 91, but having only a limited number of steps. This carrying receiver is connected to the next higher receiver 70 also by a strap 144 which also carries an index 93 while this carrying receiver itself is also arranged to cooperate with a special index 162 as hereinafter described. There is similarly a carrying receiver in each of the fourth, fifth, sixth and seventh columns with similar carrying connections as will be readily seen from a reference to Figures 30 to 37 inclusive.

As will readily be seen upon reference to Figures 37 and 38 in connection with Figure 46, the excess accumulations from any column are carried over to respective receivers in the next higher columns. Accordingly it will be seen that upon condensing of all of the receivers the settings in the several banks will not only be accumulated but the excess from one bank will be transferred to the next higher bank so that the final reading of a given problem such, for instance, as "98" times "76" will be "7448" as required.

It is not necessary for carrying to take place that one bank be condensed in advance of the other, for it will be seen that if, for instance, the carrying receivers be rotated through one or more steps after the readings in those banks have been condensed, then carrying can still take place for the reason that any carrying receiver is free to be rotated as is required for the reason that any receiver step in engagement with its index will simply slide along that index and the receiver can then jump to the next step. Accordingly the device is positive as well as accurate in this respect and carrying will take place even though all of the receivers are in engagement with their indices when the carrying operation takes place.

The fact that the accumulation of two partial products into a single receiver 91 exceeds ten, as may take place when, for instance, "9" and "8" are set into a receiver through the floating lever 105, Figure 45, is taken care of by the fact that the number of steps on a receiver can be made in excess of ten. By computation and suitable design the number of steps in a receiver is varied in accordance with its position. In general the number of steps on an accumulating receiver need not exceed seventeen, while the number of steps on a carrying receiver need not exceed five. Where a receiver is, however, set by more than one stop element, then the digital stops on that receiver should and must exceed ten.

*Product designating or printing mechanism*

Referring to Figures 1, 2, 3, 4, 7, 41, 44 and 45, cooperating with the heads 148 are stepped heads 163 whose steps 164 correspond to the steps 149 and are also ten in number. These heads are on the ends of bars 165 which are guided by a cross-bar 166 mounted on the cross-piece 86 and between the sides 2. These bars 165 are normally moved to the right, Figure 44, by springs 167 anchored on a cross-piece 168, but are normally retained in retracted position by lugs 169 cooperating with a shiftable cross-bar 170 hereinafter described.

Properly spaced on the shaft 171 in the sides 2 are levers 172 which are connected by links 173 with extensions 174 on the bars 165. It will be noted that these extensions are condensed to correspond to the condensed relation of the arms 172 and these extensions are in turn guided on a suitably grooved cross-bar 175, Figure 4, which is mounted on a cross-piece 176 connecting the sides 2. The arms 172 have extensions 177, each of which is connected with a vertically slidable type carrier 178 guided in a cross-piece 179 connecting the sides 2, and this carrier 178 carries a series of type-bars 180 cooperating with a platen 181. The type are mounted in a manner well known in calculating machines, it being noted that there are ten type, each normally held in retracted position by a spring. These type are moved against the platen by hammers 182 in a manner hereinafter to be described.

Assuming that the heads 148 are normally in a position with the highest stops corresponding to the "0" in position to be engaged by the heads 163 and assuming that these heads are normally held in retracted position by the cross-bar 170 so as to be free from the heads when all of these heads are in "0" position, the carriers 178 will remain in depressed position until the heads 163 are released to engage with the heads 148. Assuming, however, that the heads 148 are set to indicate a final product such as "48", Figure 44, then these heads will be so shifted that upon release of the bars 165, the bars 178 and the type thereon will be so positioned with respect to the printing line on the platen that the type thereon will print the total "48". If the final product contains a "0", the "0" type will be positioned on the printing line.

*Multiplier and multiplicand indicating and recording mechanism*

Referring to Figures 1, 2, 3, 7, 13, 41 and 44, and more particularly the last figure, each of the key set bars 22 has a laterally turned lug 190 taking behind a stud 191 on a bar 192 guided in bearings on the cross-bar 20 and on a similar cross-bar 193. There are a series of bars 192 corresponding in number to the bars 22 and each is, like the bars 165 tensioned by a spring 167 and has a lug 169 taking against the cross bar 170. The bars 192 are connected by links 194 with levers 195 similar to 172 and also spaced on the shaft 171. Similar extensions 196 connect with type carriers 197 carrying type 198 and arranged to be struck by hammers 182 as hereinafter described. In order to properly space and condense the type carriers 197 and the levers 195, some of the bars 192 have lateral extensions 199.

Upon setting of the multiplier and the multiplicand bars 22 by the keys, the lugs 190 will be set to positions corresponding to the digits of the respective orders. When, therefore, the bar 170 is moved forwardly as hereinafter described the springs 167 will move the bars 192 to the right, Figure 44, thereby causing the type carrier 197 to be raised to place on the printing line the type corresponding to the digits of the respective orders of the depressed keys.

*Segregating mechanism control*

Upon reference to Figures 44, 45 and 46, it will be seen that upon depression of a units multiplier key and a units multiplicand key, in order to obtain a product resulting from the multiplication of these two single digit items, only the receiver in the first bank and the first receiver in the second bank controlled by the links 94 and 104 should be actuated. Since, however, all corresponding stop elements on, for instance, shaft 50, Figure 46, are set to the same positions as the first stop elements, it will be seen that unless, for instance, links 116 and 119 are restrained against movement, then they will be permitted to move forwardly to the limit of their movement as seen in dotted lines, Figure 39. This is not true of the receiver controlled, for instance, by the link 110 in the same diagonal plane as 94 and 104, Figure 45, for the reason that since the "0" stop element is at that time in the path of the fingers 114 and 115, the "0" stop element of the first group on shaft 51 will itself form stops for the fingers 114 and 115 so as to maintain the first receiver in the third bank in "0" position and so as to maintain in the first receiver in the second bank at a position determined by the single digit of the stop element "8", Figure 44.

It is furthermore desirable that each of the links 94 and 104 and 110 in the first diagonal plane be maintained against movement until a key in the units key of multiplicand keys has been depressed, for otherwise there is an idle movement of the receivers even when no multiplicand key is depressed which, of course, is undesirable.

Referring now to Figures 7, 12, 18, 19 and 44, it will be seen that each link 94 and 104, etc. has a lug 210 provided with a notch 211, and cooperating with the series of links in each diagonal plane is a latching bar 212 slidably guided on the cross-pieces 96 by slots 213 engaging studs on these cross-pieces. Each of these bars 212 also has a series of notches 214 one for each lug 210, and is tensioned by a spring 215, the construction being such that when the edge of the bar is in the respective slots 211, the links 94, etc. will be retained against movement, while if this bar is slightly raised to aline the notches 214 with the lugs 210, the links are permitted to move forwardly under, the action of springs 107 connecting the bars with the cross-pieces 96. Each bar is connected with a lever 216 pivoted on a bracket 217 mounted on the cross-piece 96 and each lever is connected by a link 218 with an arm 219 on a shaft 220 mounted in 217 and provided with a radially extending roll 221 arranged to engage a cam face 222 on a key actuated bar 22. Each latch bar 212 controlling a series of links in the same diagonal plane, is controlled from a key-set bar 22, the first series by the units multiplicand bar, the second by the tens multiplicand bar, etc.

It will thus be seen that all the links connecting with the receivers will be latched against movement unless a multiplicand key has been depressed. Furthermore upon depression of a units multiplicand key, only those links which are required for actuation or the one which is normally retained in zero position will be released, while all others will be locked. The same is true as to those links 116, 119, 122 and 405 which are controlled by tens bank of multiplicand keys. It is, therefore, insured that only the required receivers will be set to secure correct operation for segregation and accumulation.

Printing mechanism

Referring to Figures 1, 2, 3, 5, 7, 39, 41, 42, 43, 44, and 50, and first more particularly to Figures 41, 43, 44 and 50, cooperating with the type 180 and 198 are hammers 182, there being a series (in this case 14) of hammers maintained in spaced relation on a shaft 226 between a pair of side plates 227, Figure 1, mounted on a cross-member 179 and the shaft 171. Each hammer is tensioned by a spring 229 and is retained by a latch 230, there being a series mounted on a shaft 231 between the plates 227. The heel of each latch engages with a cam 232 on a lever 172 or 195, and is held engaged by a spring 233. The hammers 182 are further collectively retained by a latch 234 fixed on a shaft 235 journalled in plates 227 and having an arm 236 connected with an arm 237 fixed on rock shaft 243 journalled in 227 and 2 and having fixed thereto an arm 244 (Figure 5) connected by a link 238 with a lever 304 fixed to a rock shaft 239 which has arms 240 provided with the cross-bar 170, which as previously described, engages the lugs 169 on the bars 165 and 192. The shaft 235 has fixed thereto an arm 2350 tensioned by a spring 2351 anchored on 227.

Assuming that the parts are shown in the position, Figures 41 and 42, in which the hammers are latched individually by latches 230, and collectively by the latch 234, the movement of any lever 172 or 195 will cause the cam 232 to release the corresponding latch 230; thereafter the movement of the latch 234 by the lever 244 and connections, unlatches the hammer which can, therefore, cooperate with its corresponding type while the remaining hammers will remain latched. In accordance with the usual calculating machine practice, the release of any hammer will automatically release the hammers of the lower order in the same group and this is accomplished by causing a latch of a higher order to bear against a lug 242 of the lower order.

Referring to Figures 1, 2, 41 and 43, the platen 181 is mounted in bearings 245 on a cross-piece 246 and has a ratchet 247 engaged by a pawl 248 on a carrier 249 tensioned by a spring 250. The carrier is connected by a link 251 to a lever 252 provided with a pin 253 engaging an L-shaped slot 254 in a link 255 connecting with an arm 256 on the rock shaft 239. The link 255 is tensioned by a spring 257 and a pin 258 on the lever 252 is arranged to bear against the link 255.

When the shaft 239 moves counter-clockwise, the link 255 will travel until the pin 253 reaches the off-set in the slot 254, causing the off-set to snap over the pin 253; further movement will cause the pawl 248 to move back on the ratchet 247. On return movement of the arm 256, the pawl will move back to feed the paper and after predetermined travel, the engagement of the pin 258 with the link 255 will force the pin 253 out of the off-set.

The ribbon feed is shown in Figures 1, 2 and 39, and comprises a pair of spools 260 each mounted on a shaft 261 having bevel gear connections with a shaft 262 provided with a ratchet 263 engaged by a pawl 264 on a link 265 connecting with an arm 266 on the shaft 239. The ribbon 267 passes through slotted carriers 268 at the ends of the type carriers and slidable in the cross-piece 179, and each carrier 268 at its lower end has a cam roll engaging a cam on a link 269 guided at its end in a slot in the cross-piece 179. One link 269 is connected to the arm 266 while the other link is connected with a similar arm also fixed to the rock shaft 239. Upon oscillation of the shaft 239, the ribbon will not only be fed but will be moved up and down into and out of the path of the type as required.

Actuating mechanism

After the multiplier and the multiplicand have been set upon the key board, thereby causing the partial product setting-up devices to set up the partial products, it is necessary to set the receivers in order to segregate the partial products therein. It is then necessary to accumulate or condense the receiver settings and to designate or print the total as well as to designate or print the multiplier and multiplicand. Actuating mechanism for this purpose will now be described.

Referring to Figures 1, 2, 3, 5, 6, 7, 39 and 41, arranged to the right of the multiplicand key board and guided by the flanges of the carrier 3 is a depressible trip bar 275, Figure 39, whose shanks 276 are guided in the flanges and which trip bar is held in raised position by a spring 277. A pin 278 bears on one end of a lever 279 on the carrier 3 and is tensioned by a spring 280 while the other arm connects by a link 281 with a lever 282 fixed to a rock shaft 283 mounted in the sides having arms 284 fixed thereto and carrying latches 285 engaging a cross-head. This cross-head comprises a pair of side members 286 connected by cross-bars 287 projecting through and guided in slots 288 in the sides 2. This cross-head also carries the cross-bars 109 which, as previously described, are engaged by the lugs 108 on the various links 94, 104, etc. The side members of the cross-head have pins 289 engaging slots in the ends of arms 290 pivoted on and inside of the sides 2 at 291 and tensioned by springs 292.

Hooks 293 on the cross-head are arranged to engage with the tips 294 on arms 295 pivoted at 296 on and inside of the sides 2 and having attached connected arms 297 connected by links 298 with the latches 139, Figures 5 and 6.

Pivoted on the sides, Figures 5 and 6, are levers 299 whose tips 300 are arranged for engagement by lugs 301 on the cross-head 138 and these arms 299 are connected by links 302 with spring-controlled latches 303 engaging levers 304 fixed to the rock-shaft 239. Each lever 304 has a connected link 305 tensioned by a spring 306 and one lever has a link 307 provided with a piston working in a dash pot cylinder 308.

Assuming that the proper multiplier and multiplicand keys have been depressed to set up, for instance, the partial products resulting from the multiplication of "76" by "98", upon depression of the trip bar 275 the following action will take place: The cross-head 286, 287 will be released, thereby causing the springs 292 to move it to the left, Figures 39 and 41. This will permit the links 94, 104, etc. Figure 45, to move forwardly thereby setting all of the partial products as well as the sub-totals in the proper receivers. At the end of its travel, the cross-head will engage the arms 295, thereby releasing the latches 139, Figures 5 and 6, and releasing the cross-head 138, thereby permitting all of the nuts 135 to move down on their shafts 126 under the tension of their springs 134, Figure 23. This will cause condensing of the receivers in the various banks in accordance with the partial product set up and will cause rotation of the corresponding heads 148 to indicate the total, while the other heads will remain inactive or at "0" position. Any carrying which may be required also takes place at this time. At the end of the travel of the cross-head 138, its engagement with the tip of the arm 299 will cause the lever 304 to be released, thereby rocking the rock shaft 239 counterclockwise or to the right, Figures 41 and 44. This will release the bars 165, thereby permitting them to move forward until their heads 163 are properly positioned by the heads 148 and will cause the type carriers 178 to move to corresponding positions, it being noted that those heads 148 which are at "0" position will simply cause the connected "0" type to be placed on the printing line of the platen 181. The movement of the cross-bar 170, however, also releases the bars 192 so that these can now move to the positions corresponding to the depressed keys, thereby moving the type carriers 197 with the proper type thereon on the printing line. The proper type for indicating both the final product and for indicating also the multiplier and multiplicand will, therefore, be at the printing line.

The movement of the rock shaft 239 has caused the latch 234 to be moved to released position thereby releasing all the hammers 182. These hammers are, however, retained by the individual latches 230 which are, however, released upon movement of the levers 172 and 195 as previously explained so that these levers are now released to cooperate with the type. The movement of the rock shaft 239 also causes the link 269, Figure 39, to raise the ribbon 267 in front of the type on the printing line in order that impressions may be received on the paper strip 309 as shown in Figure 49 and the mechanism is so timed that the ribbon will be fully raised before the hammers are released and this ribbon will be maintained in position until the machine is again clear.

*Resetting or clearing mechanism*

Referring to Figures 1, 2, 5, 6, 7, 12, 13, 14, 38, 39, and 41, mounted in the sides 2 is a rock shaft 320, Figures 5 and 6, which has fixed thereto at one end, Figure 5, a crank 321 and a segment having an arm 322 arranged to take against adjustable stops 323 on the base 1 and a notched segment 324 arranged to cooperate with a spring-pressed detent 325 in a support 326 on the plate 2. The detent 325 cooperates with the notches on the segment to not only locate it in the different positions for clearing the machine, but this also prevents return movement of the crank until any given stroke has been fully completed. Such so-called stroke mechanism is well known in the art and need not be further described. The rock shaft 320 has fixed thereto arms 327 which connect by links 328 with cam segments fixed in another rock shaft 330 also mounted in the side plates.

Each cam 329 cooperates with a cam roll on a lever 331 tensioned by a spring 332 and having a lost motion connection with the link 305 which as previously described leads to the lever 304 on the rock shaft 239. This rock shaft, Figure 41, has fixed thereto an arm 333 connected by a link 334 to an arm 3350 fixed to the shaft 226 on which, as previously described, the hammers 182 are loosely mounted; this shaft has fixed thereto arms 335 connected by a bar 337 in the path of the hammers 182.

The rock shaft 320, Figures 5 and 6, has fixed thereto arms 338 connected with links 339 which have lost motion connections with bell crank levers 340 loose on the shaft 330 and connected by links 341 with the cross-head 135.

The indices 93 at the ends of the first and second banks, Figures 23 and 25, are engaged by collars 342 sliding on shafts 343 and pressed down by springs 344. Each of the other indices 162 for each of the other banks is, however, fixed to a collar 345 rotatively mounted on a sleeve 346 fixed to a stirrup 347 taking over the receiver adjacent thereto in the same manner that the other stirrups take over the next higher receiver. The collar 345 has a slot 348 engaged by a pin 349 on the stirrup 347 and, therefore, connected with the sleeve 346. A spring 350 connects the collar 345 with the sleeve 346 and normally holds the pin 349 in the end of the slot 348 as shown in Figure 38. It will be understood that although there is clearance between the several recesses and their respective indices, this is taken up upon setting and condensation thereof so that when taken up with all parts at zero the heads 148 will be at "0".

Fixed to the rock shaft 320, Figures 39 and 41, are cams 360 each of which is arranged to engage a cam roll 361 on a lever 362 pivoted on the plate 2 tensioned by a spring 363 and having a lost motion connection with a link 364 connecting with the lever 290.

Fixed to the rock shaft 320, Figure 39 is a cam 365 which is arranged to engage a cam roll 366 on a lever 367 pivoted on the plate 2 tensioned by a spring 368 and having a lost motion connection with the link 369 connected with an arm 370 on a rock shaft 371. This rock shaft has fixed thereto arms 372 connected by a cross-bar 373 arranged to engage up-standing lugs 374 on the multiplicand bars 22.

The rock shaft 320, Figures 6 and 41, has a cam 375 which is arranged to engage a cam roll 376 on a lever 377 pivoted on the plate 2 tensioned by a spring 378 and having a lost motion connection with a link 379 connected with an arm 380 fixed to a rock shaft 381 and held against a stop 382 on the side 2 by a spring 383. This rock shaft has fixed thereto arms 384 connected by cross bar 385 in the path of up-standing lugs 386 on the multiplier bars 22.

The end bank, Figures 12, 13 and 14, of each of the multiplier and multiplicand keys has its bar 22 provided with a lug 387 in the path of a downwardly projecting pin on a lever 388 pivoted on the cross piece 6 and connected with a slide 389 guided on the cross-piece 6. This slide is tensioned by a spring 390 and has openings 391 therein engaging screw studs 392 on the latches 15.

Assuming the machine to be set as heretofore described, it is cleared by moving the crank 321 forwardly to the limit of its movement determined by the right stop 323, Figure 5, and the crank is then moved back to the position determined by the left stop 323. During this operation the clearing is successively accomplished in the following order. The hammers are restored and latched, the platen advanced, the ribbon feed operated, the type and connected bars 165 and 192 restored and the shafts 126 and the heads 148 thereon restored. This takes place during the forward movement of the crank. During the back movement of the crank the receivers are restored, thereby moving the fingers out of engagement with the stop elements; these stop elements are then oscillated back to normal position with the connected multiplicand key set bars and keys; the groups of stop elements together with the corresponding key bars and keys are then moved back to normal positions; finally all parts are latched in these normal positions.

The mechanism for accomplishing this sequence of operation has been fully described and will now only be briefly referred to.

Upon forward movement of the crank, the engagement of the cams 329, Figures 5 and 6, with the levers 331 will move the levers 304 clockwise, Figure 5, until engaged by their latches 303. This will move the hammers 182 back through the line of connections 333 to 337, Figure 41, while the hammer latch 234 is engaged with these hammers through the line of connections 238 to 235. The bars 165 and 192 are also returned carrying the type carriers and type with them by the movement to the left, Figure 41, of the cross-bar 170 connected with the rock shaft 239 and this also permits the hammer latches 230 to engage individually with the hammers. The paper feed mechanism is also actuated through the arm 256 while the ribbon feed is also actuated through the arm 266, both of which are on the rock shaft 239. After the heads 163 are withdrawn from the heads 148, the lost motion between the link 339 and the lever 340 has been taken up so that the cross-head 135 will now be raised until locked by its latches 139. It will be noted from Figure 40 that each of the arms 295 has a cam tip 393 loose on the arm and provided with a stop 394 held against a corresponding stop-face 395 by a spring 396. When the cross-head has moved to the left, Figure 39, in the setting of the machine, the hook 293 will snap behind the tips 393 so that the latches 139 are free to engage even though the cross-head is still in set position. This restoring of the cross-head restores all of the heads 148 to "0" position carrying with it the shaft 126. This also restores all of the carrying receivers 161 which is, however, permitted since the springs 350, Figure 37, allow the indices 162 to move backwardly even though these indices are in engagement with the stops on the carrying receivers. When all of the receivers are raised, these indices 162 can move back to normal position under the tension of the springs 350, Figure 37, until the pins 349 again engage the stop shoulders 348. It will also be noted that this lifts all of the receivers clear of their indices 93. The springs 344 are provided in order to take care of any lost motion.

Upon the forward movement of the crank, the cams 360, 365 and 375, Figures 39 and 41, move on one side of the respective cam rolls 361, 366 and 376. The lost motion connections of the levers 362, 367 and 377 with the respective links 364, 369 and 379 will, however, cause idle movements of these levers without any effect. Upon return movement of these cams, however, they will engage the other sides of the cam rolls and operate as follows:

Upon movement of the cam 360 from dotted to full line position, Figure 39, it will by engagement with the cam roll 361 and the connection to the lever 290 move the cross-head back until engaged by the latches 285; the tips 293 can move free of the tips 393, Figure 40, in view of the fact that these tips can swing freely without moving the arms 295 and without again disengaging the latches 139. This will move all of the receivers back to "0" position until the lowest or zero stops thereon are opposite their indices.

Upon movement of the cam 365 from dotted to full line position, Figure 39, it will operate through the connections to the cross-bar 373 heretofore described to move all of the multiplicand bars 22 back to normal position; this will through the connection to the stop elements shift them back to normal positions; the parts are then latched in normal positions by the latches 25, Figure 16. The depressed keys are also released through the slide connection 389 to the respective latches 15, Figure 15.

Upon movement of the cam 375, Figure 41, from dotted to full line position, it will operate on the cam roll 376 and the connections to the cross-bar 385 to return all of the multiplier slides to normal "0" position; this will shift all of the groups of stop elements back to normal positions and they are latched in these positions by the latches 25; the depressed multiplier keys will also be released through the slide connections 389.

Resumé of operations

Assuming that a given multiplicand "76" is to be multiplied by a given multiplier "98", the operations will be briefly as follows: The multiplier is set on the multiplier bank or section by simple depression of the keys; this will shift the group of stop elements with the proper elements at the slots 61. The multiplicand is now set on the multiplicand bank or section by simple depression of the keys; this will shift the positioned elements to the proper positions in the slots 61. These elements are now in positions to set up the partial products resulting from the multiplication of "76" by "98".

Upon release of the actuating mechanism set in motion by the simple depression of the bar 275, the operation will be as follows: The cross-head moves forwardly to release the links 94, 104, etc., thereby permitting these links to be positioned by engagement of their fingers 102, 106, etc. with the elements of the setting up devices. This will not only segregate the partial products into the proper receivers but will also partially combine certain of these products into common receivers. The partial products will, therefore, be segregated into as well as partially accumulated into the several receivers and in the respective banks, assemblies or groups thereof, with each receiver or receiving elements set in accordance with the orders of the digits of the final product, and with the digit settings of the same order assembled in the same group or assembly. In some cases a receiver is set by and in accordance with the accumulated settings of a series of setting up devices or stop elements, by a series of leads from a series of such devices to a common receiver; in such cases, however, the receiver is directly and concurrently set by a series of the setting up devices or stop elements.

After the receivers have been thus set, the settings of the several receivers are condensed, accumulated or integrated. This is accomplished by condensing the mutually engaging receivers, which are arranged in series and loosely connected. The settings of the receivers are accumulated by condensing the settings of each bank and setting the accumulations into the product taking elements, each of which receives the accumulated setting of its corresponding bank, and which elements are, therefore, arranged, as the banks, in accordance with the orders of the final product. The excess accumulation from one bank is transferred to the bank of the next higher order, and this is accomplished by transferring such excess through the medium of the accumulating or condensing mechanism to a carrying receiver in that next bank. The setting of that carrying receiver is then combined with the settings of the other receivers in that bank. The result is, therefore, that the final product is set into product taking elements arranged in accordance with and corresponding to the orders of the final product. The setting of the final product is now set up in the designating or printing mechanism so as to designate or print the final product.

The setting up of the multiplicand and the multiplier on the key board has set mechanism for designating and printing these items, and these mechanisms are also actuated upon depression of the bar 275. The multiplicand and multiplier designating or printing mechanism is, however, so coordinated with the final product designating or recording mechanism, that the designation or printing of one will be maintained during the designation or printing of the other, and so that the designation or printing of the former will result in the designation of the latter. This result is assured by so interconnecting the mechanisms, that the multiplicand and multiplier designating or printing mechanisms, operate and are dependent upon the setting of the setting-up devices, and by maintaining the connections until after the machine is cleared or restored. Accordingly the final product actually designated or printed, necessarily corresponds to the multiplicand and multiplier designated or printed as well as set up on the key board. Accordingly this furnishes an accurate check from the record on the paper or as observed by the indicating means. The machine is, therefore, actually a listing machine.

Upon designation or printing of the multiplicand and multiplier and the final product, the machine is cleared by simple actuation of an actuator, in this illustration a handle; mechanism then operates to return all parts back to normal without interference of parts.

*Capacity of machine*

In the description so far, mechanism has been described of a two digit multiplicand and a two digit multiplier capacity. This has been done for the purpose to more clearly illustrate the operation. In the actual machine described, however, the capacity of the machine is that of a four digit multiplicand and a three digit multiplier. It will be understood, however, that following the principles of this invention, a machine of any desired capacity may be built up by simply increasing the banks of multiplicand keys and the banks of multiplier keys, the groups of partial products setting-up devices, the groups of links 94, 104, etc., the groups or banks of receivers, product taking elements, etc. A comparison of Figure 47, which shows a two by two capacity machine, with Figure 48, which shows a four by three capacity machine will illustrate how the capacity can be readily increased and is actually increased in the machine illustrated in the drawings, which as heretofore stated, is a four by three capacity machine. The connections to the other banks will, therefore, be only very briefly described.

It will be noted from Figures 18, 46 and 47 that the links 94, 104, and 110 are, for instance, arranged in a diagonal plane and that these links go respectively to the receiver of the first bank, the first receiver of the second bank and the first receiver of the third bank. Furthermore the links 116, 119 and 122 lead respectively to the second receiver of the second bank, the second receiver of the third bank and the second receiver of the fourth bank. This is shown diagrammatically on Figure 47 where the arrows leading into the receivers 91 designate the links 94, 104, etc., while the lines leading from the stop elements into the several receivers designate the fingers 102, 106, etc. engaging the stop elements.

The specific embodiment illustrated in the drawings and having a capacity of a four digit multiplicand and a three digit multiplier is diagrammatically shown in Figure 48 and the connections to the several receivers are shown in Figures 7, 27, 29, 31, 33 and 35. Thus the first group of stop elements in the second row has a stop finger 114 leading to a link 110 to the first receiver in the third column, while the first group of stop elements in the third row has a finger 402 also connecting with the link 110 through the lever 111, see Figure 46; this group of stop elements also has a finger 400 connected with a link 401 leading to the first receiver in the fourth column (Figure 48). The second group of stop elements in the third row has a stop finger 403 connecting with the link 122 being connected to the lower end of the lever 123, Figure 46, while also cooperating with this same group of stop elements is a finger 404 connected with a link 405 leading to the first receiver in the fifth column. The third group of stop elements in the first row has a finger 406 connected with the link 407 leading to the third receiver in the third column, and cooperating with this same group of stop elements is a finger 408 connected with a link 409 leading to the third receiver in the fourth column. The third group of stop elements in the second row has cooperating therewith a finger 410 connected through a floating lever, such as 105, with the link 409, while also cooperating with this group of stop elements is a finger 411 connecting with a link 412 leading to the second receiver in the fifth column. The third group of stop elements in the third row has cooperating therewith a finger 413 connecting with the link 412, while this group has also cooperating therewith a finger 414 connected with a link 415 leading to the first receiver in the sixth column. The fourth group of stop elements in the first row has cooperating therewith a finger 416 connecting with a link 417 leading to the fourth receiver in the fourth column, while cooperating with this group of stop elements is a finger 418 connected with a link 419 leading to the third receiver in the fifth column. The fourth group of stop elements in the second row has cooperating therewith a finger 420 connected with the link 419 through a floating lever, such as 105, while this group of stop elements has also cooperating therewith a stop finger 421 connecting with a link 422 leading to the second receiver in the sixth column. The fourth group of stop elements in the third row has cooperating therewith a stop finger 423 connected with the link 422 by a floating lever, such as 105, and this group has also cooperating therewith a stop finger 424 connected with a link 425 leading to the receiver in the seventh column.

Reference to Figures 1, 2, 18, 23 to 35 inclusive and 48 will, therefore, show that the connections are such that the proper partial products, sub-totals and final totals will be set up, segregated, accumulated and that the capacity of the machine can be increased to any desired extent by adding sections. Thus, the multiplicand can be increased by adding to the group of stop elements on each shaft, it being understood that in order to increase the multiplicand by one digit, another group of stop elements and associated mechanism and corresponding receivers is added. In order to increase the multiplier digits, it is necessary to add an additional shaft with a group of stop elements thereon and, of course, add the necessary receivers, etc.

It will be particularly noted that since the partial products are segregated in the various receivers arranged in banks corresponding to the orders of the final product, and since the settings of the receivers in the various banks are condensed, the digits of the final product appears at the terminals of the respective banks; for the excess in one order or bank is transferred to a receiver of a higher order so that the condensing of the receivers in the banks will condense the partial products as well as the excess accumulations. Accordingly it is not necessary that carrying take place in any counting mechanism, but the digits of the final product are produced and appear at the terminals of the respective banks where they can be taken and transferred without change to the designating or printing mechanism. The arrangement of the receivers and their connections from the partial products setting up devices is moreover such that each element has comparatively small movement and does not require a series of revolutions. Accordingly, overthrow is not liable to occur. Moreover, the construction and arrangement of the receivers results in simplification as well as in reliability of operation.

While the machine is here particularly described with reference to performing the operations of multiplication, it will be obvious that it is susceptible of performing division operations as well; for every multiplying machine is inherently a machine adapted for performing division, not only by the use of reciprocals, but by proper numbering of keys to secure the same effect. It is, therefore, to be understood that the terms, multiplier, multiplicand and product, are used in a descriptive rather than in a limitative sense, so that they can be applied to dividend, divisor and quotient, respectively.

It will, furthermore, be understood that certain features and sub-combinations are of utility and may be employed without reference to other features and sub-combinations; that is contemplated by and is within the scope of the appended claims. It is furthermore obvious that various changes may be made in details of construction, within the scope of the appended claims, without departing from the spirit of this invention. It is, therefore, to be understood that this invention is not to be limited to the specific details shown and/or described.

Having thus described the invention, what is claimed is:

1. In a machine of the character described, having selective manipulative means for setting up the multiplier and multiplicand and partial product setting up devices controlled thereby, of mechanism set by said devices and including a rotatable shaft and an element splined on said shaft and having helically spaced stops.

2. In a machine of the character described, having selective manipulative means for setting up the multiplier and multiplicand and partial product setting up devices controlled thereby, of mechanisms set by said devices and including a rotatable shaft, an element splined to said shaft and having digital stops, and a bar having a rigid connection with said element and set by one of said devices.

3. In a machine of the character described, the combination with selective manipulative means for setting up the multiplier and multiplicand, of partial product setting up devices controlled thereby, receiving elements arranged in banks corresponding to the orders of the product and connected to be set by said devices, one of said elements being set by a series of said devices, and means for condensing the settings of the elements in each bank adapted to produce the digits of the final product in the respective banks at the terminals thereof.

4. In a machine of the character described, the combination with selective manipulative means for setting up the multiplier and multiplicand, of partial product setting up devices controlled thereby, receiving elements arranged in banks corresponding to the orders of the product and connected to be set by said devices, one of said elements being set by one of said devices in order to set up a partial product therein and another of said elements being set by a series of said devices, and means for condensing the settings of the elements in each bank adapted to produce the digits of the final product in the respective banks at the terminals thereof.

5. In a machine of the character described, the combination with selective manipulative means for setting up the multiplier and multiplicand, of partial product setting up devices controlled thereby, receiving elements connected to be set by said devices, a carrying element cooperating with said receiving elements, means for condensing the settings within said elements, and product designating means connected to be set by said receiving and carrying elements when the settings therein are condensed.

6. In a machine of the character described, the combination with selective manipulative means for setting up the multiplier and multiplicand, of partial product setting up devices controlled thereby, receiving elements connected to be set by said devices, a carrying element, means for transferring the excess setting of a receiving to a carrying element, means for condensing the settings within said elements, and product designating means connected to be set by said receiving and carrying elements when the settings therein are condensed.

7. In a machine of the character described, the combination with selective manipulative means for setting up the multiplier and multiplicand, of partial product setting up devices controlled thereby, receiving elements connected to be set by said devices, a carrying element, means for accumulating on a receiving element the settings from a series of said devices, means for transferring the excess setting of a receiving element to said carrying element, means for condensing the settings within said elements, and product designating means connected to be set by said receiving and carrying elements when the settings therein are condensed.

8. In a machine of the character described, the combination with a series of receivers arranged in a bank, of means for setting said receivers, and condensing means for directly connecting said receivers with one another in series to accumulate their settings in their bank after the said receivers have been set.

9. In a machine of the character described, the combination with a series of receivers arranged in a bank, of means for setting said receivers, and an index on one receiver engaging with another receiver.

10. In a machine of the character described, the combination with receivers arranged in series, of means for setting said receivers, and means operating upon relative movement of said receivers adapted to accumulate the settings therein after said receivers have been set.

11. In a machine of the character described, the combination with a series of receivers arranged in a bank, of means for setting said receivers, means for directly connecting said receivers in series, and means operating upon relative movement of said receivers adapted to accumulate the settings therein after said receivers have been set.

12. In a machine of the character described, the combination with a series of relatively movable receivers, of means for setting said receivers, and means operating upon their relative movement for condensing the settings of said receivers to accumulate their settings after said receivers have been set.

13. In a machine of the character described, the combination with a series of relatively movable receivers of an index on one receiver cooperating with another receiver, means for setting said receivers, and means operating upon relative movement of said receivers adapted to accumulate their settings.

14. In a machine of the character described, the combination with a series of receivers, of means for setting said receivers, and means operating upon their relative movement for condensing the settings of said receivers to accumulate their settings after said receivers have been set.

15. In a machine of the character described, the combination with a series of relatively movable stepped receivers, of means for setting said receivers, and an index on one receiver cooperating with any one of the steps on another receiver.

16. In a machine of the character described, the combination with a series of relatively movable stepped receivers, of means for setting said receivers, an index cooperating with the steps on a receiver, and an index on one of said receivers cooperating with any one of the steps on another receiver.

17. In a machine of the character described, the combination with a series of relatively rotatable stepped receivers, of means for setting said receivers, and an index on one receiver cooperating with any one of the steps on another receiver.

18. In a machine of the character described, the combination with a series of cooperating stepped receivers, of means for rotatably setting said receivers, and means for relatively moving said receivers axially.

19. In a machine of the character described, the combination with a series of stepped receivers, of means for rotatively setting said receivers, means for relatively shifting said receivers axially, and an index on one receiver cooperating with any one of the steps on another receiver.

20. In a machine of the character described, the combination with a series of stepped receivers, of means for rotatively setting said receivers, means for mounting said receivers for axial movements, an index cooperating with any one of the steps on one receiver, and an index on said receiver cooperating with any one of the steps on another receiver.

21. In a machine of the character described, the combination with a receiver arranged in one bank, of means for setting said receiver, carrying means arranged in a second bank and connected to be set in accordance with the excess setting of said first receiver, receiving means in said second bank and means for setting the same, and means for accumulating the settings of the carrying and receiving means in said second bank.

22. In a machine of the character described, the combination with a receiver arranged in one bank, of means for setting said receiver, a carrying receiver arranged in a second bank and connected to be set in accordance with the excess setting of said first receiver, a series of receivers in said second bank and means for setting the same, and means for accumulating the settings of the receivers in said second bank.

23. In a machine of the character described, the combination with a series of receivers arranged in one bank, of means for setting the same, means for accumulating the settings of said receivers, carrying means arranged in a second bank and connected to be set in accordance with the excess of said accumulations, receiving means in said second bank and means for setting the same, and means for accumulating the settings of the carrying and receiving means in said second bank.

24. In a machine of the character described, the combination with a series of receivers arranged in one bank, of means for setting the same, means for accumulating the settings of said receivers, a carrying receiver arranged in a second bank and connected to be set in accordance with the excess of said accumulations, a series of receivers in said second bank and means for setting the same, and means for accumulating the settings of the receivers in said second bank.

25. In a machine of the character described, the combination with a series of receivers arranged in one bank, of means for setting the same, means for accumulating the settings of said receivers, a carrying receiver arranged in a second bank and connected to be set in accordance with the excess of said accumulations, a series of receivers in said second bank and means for setting the same, means for accumulating the settings of the receivers in said second bank, and a second carrying receiver connected to be set in accordance with the excess of said accumulations in said second bank.

26. In a machine of the character described, the combination with selective manipulative means for setting up a multi-digit multiplicand and multi-digit multiplier, of setting up devices controlled thereby in order to set up the several resulting partial products, a series of receivers arranged in banks, setting connections from devices of any particular order to the bank, in order to segregate the partial products therein, means for condensing the settings within said receivers, and product designating means each connected to be set by its corresponding bank.

27. In a machine of the character described, the combination with selective manipulative means for setting up a multi-digit multiplicand and multi-digit multiplier, of setting up devices controlled thereby in order to set up the several resulting partial products, a series of receivers arranged in banks, setting connections from devices of any particular order to the corresponding bank, and carrying receivers in said banks and cooperating with the other receivers therein.

28. In a machine of the character described, the combination with selective manipulative means for setting up a multi-digit multiplicand and multi-digit multiplier, of setting up devices controlled thereby in order to set up the several resulting partial products, a series of receivers arranged in banks, setting connections from devices of any particular order to the corresponding bank, and means for directly condensing the settings in the several banks.

29. In a machine of the character described, the combination with selective manipulative means for setting up a multi-digit multiplicand and multi-digit multiplier, of setting up devices controlled thereby in order to set up the several resulting partial products, a series of receivers arranged in banks, setting connections from devices of any particular order to the corresponding bank, means for accumulating the settings within the several banks, and carrying receivers controlled by said accumulating means.

30. In a machine of the character described, the combination with selective manipulative means for setting up a multi-digit multiplicand and a multi-digit multiplier and devices controlled thereby for setting up the various resulting partial products, of a series of receivers arranged in banks corresponding to the orders of the final product, connections from said devices to said receivers adapted to segregate and set the partial products therein, and means for condensing the settings of the receivers in each bank adapted to produce the digits of the final product in the respective banks at the terminals thereof.

31. In a machine of the character described, the combination with selective manipulative means for setting up a multi-digit multiplicand and a multi-digit multiplier and devices controlled thereby for setting up the various resulting partial products, of a series of receivers arranged in banks corresponding to the orders of the final product, connections from said devices to said receivers adapted to segregate and set the partial products therein, means for transferring the excess from any bank to the next higher bank, and means for condensing the final settings in each bank.

32. In a machine of the character described, the combination with selective manipulative means for setting up a multi-digit multiplicand and a multi-digit multiplier and devices controlled thereby for setting up the various resulting partial products, of a series of receivers arranged in banks corresponding to the orders of the final product, connections from said devices to said receivers adapted to segregate and set the partial products therein, carrying means cooperating with receivers in certain banks, and means for condensing the final settings in each bank to produce the digits of the final product in the respective banks at the terminals thereof.

33. In a machine of the character described, the combination with selective manipulative means for setting up a multi-digit multiplicand and a multi-digit multiplier and devices controlled thereby for setting up the various resulting partial products, of a series of receivers arranged in banks corresponding to the orders of the final product, connections from said devices to said receivers adapted to segregate and set the partial products therein, a carrying receiver arranged in each of certain banks, and means for condensing the settings of the receivers within each bank.

34. In a machine of the character described, the combination with selective manipulative means for setting up a multi-digit multiplicand and a multi-digit multiplier and devices controlled thereby for setting up the various resulting partial products, of a series of mutually cooperating receivers arranged in banks corresponding to the orders of the final product, connections from said devices to said receivers adapted to segregate and set the partial products therein, and means in each bank for causing the receivers in that bank to mutually cooperate to condense the settings therein.

35. In a machine of the character described, the combination with selective manipulative means for setting up a multi-digit multiplicand and a multi-digit multiplier and devices controlled thereby for setting up the various resulting partial products, of a series of mutually cooperating receivers arranged in banks corresponding to the orders of the final product, connections from said devices to said receivers adapted to segregate and set the partial products therein, a carrying receiver arranged in each of certain banks and adapted to cooperate with one of the receivers therein, and means in each bank for causing the receivers in that bank to mutually cooperate to condense the settings therein.

36. In a machine of the character described, the combination with selective manipulative means for setting up a multi-digit multiplicand and a multi-digit multiplier and devices controlled thereby for setting up the various resulting partial products, of a series of receivers arranged in banks corresponding to the orders of the final product, connections from said devices to said receivers adapted to segregate and set the partial products therein, means for condensing the settings of the receivers in each bank to produce the digits of the final product in the respective banks at the terminals thereof, designating means arranged in orders corresponding to the final product, and means for transferring the condensed settings of said receiver banks to said designating means.

37. In a machine of the character described, the combination with selective manipulative means for setting up a multi-digit multiplicand and a multi-digit multiplier and devices controlled thereby for setting up the various resulting partial products, of a series of mutually cooperating receivers arranged in banks corresponding to the orders of the final product, connections from said devices to said receivers adapted to segregate and set the partial products therein, a carrying receiver arranged in each of certain banks adapted to cooperate with one of the receivers therein, means in each bank for causing the receivers in that bank to mutually cooperate to condense the settings therein, designating means arranged in orders corresponding to the final product, and means for transferring the condensed setting of said receiver banks to said designating means.

38. In a machine of the character described having selective manipulative means for setting up the multiplier and multiplicand and partial products setting up devices controlled thereby, of mechanism in which the partial products are segregated and set comprising, stepped elements arranged in series in a bank, setting connections from said devices to said receivers, and means for interconnecting said receivers through their steps adapted to condense the setting in said bank.

39. In a machine of the character described having selective manipulative means for setting up the multplier and multiplicand and partial product setting up devices controlled thereby, of mechanism in which the partial products are segregated and set comprising, a rotatable receiver which is stepped circumferentially and axially, an index cooperating with the steps, a setting connection from said receiver to one of said devices, and means for moving said receiver relative its index.

40. In a machine of the character described, having selective manipulative means for setting up the multiplier and multiplicand and partial product setting up devices controlled thereby, of mechanism in which the partial products are segregated and set comprising, mutually cooperating receivers arranged in series in a bank, setting connections from said devices to said receivers, and means for moving said receivers relatively adapted to condense their settings.

41. In a machine of the character described having selective manipulative means for setting up the multiplier and multiplicand and partial product setting up devices controlled thereby, of mechanism in which the partial products are segregated and set comprising, stepped rotatable receivers arranged in series in a bank with an index on one receiver cooperating with the steps on the receiver adjacent thereto, setting connections from said devices to said receivers, and means for moving said receivers relatively adapted to condense their settings.

42. In a machine of the character described having selective manipulative means for setting up the multiplier and multiplicand and partial product setting up devices controlled thereby, of mechanism in which the partial products are segregated and set comprising, parallel stepped receivers mounted for rotative and axial movements with an index on one receiver cooperating with the steps on the receiver adjacent thereto, setting connections from said devices to said receivers, and means for moving said receivers relatively adapted to condense their settings.

43. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, and mutually cooperating means adapted to list the multiplicand and the multiplier so set up in coordination with the final product so set up.

44. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, and means for listing the multiplicand and the multiplier in coordination with the resulting final product comprising, printing devices set by said selective manipulative means and a printing device set by said accumulating means.

45. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, devices for printing the multiplicand, the multiplier and the resulting final product in listing relation, and means operating automatically and as an incident to the actuation of said product printing means adapted to actuate said multiplicand and multiplier printing means.

46. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, a platen adapted to receive a record strip, printing devices cooperating with said platen and adapted to print the multiplicand, the multiplier and the resulting final product in listing relation on the strip, and means for actuating said printing devices in coordination and in accordance with the settings of said selective manipulative means and of said accumulating means.

47. In a machine of the character described, the combination with selective manipulative mean for setting up a multi-digit multiplicand and a multi-digit multiplier, of means controlled thereby for setting up and segregating the various resulting partial products, means for accumulating the partial products in order to set up the resulting final product, a platen adapted to receive a record strip, printing devices set by said selective manipulative means, a printing device set by said accumulating means, said printing devices being adapted to cooperate with said platen in order to print the multiplicand, the multiplier and the resulting final product in listing relation on the strip, and means operating automatically and as an incident to the actuation of said product printing means adapted to actuate said multiplicand and multiplier printing means.

48. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, means for listing the multiplicand and the multiplier in coordination with the resulting final product comprising, printing devices set by said selective manipulative means and a printing device set by said accumulating means, means for clearing the machine, and means for maintaining the settings of said printing devices until the machine is cleared.

49. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, devices for printing the multiplicand, the multiplier and the resulting final product in listing relation, actuating means adapted to secure the setting of the final product, and means operating upon such setting adapted to set said printing devices in accordance with the settings of said selective manipulative means and of said accumulating means.

50. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, devices for printing the multiplicand the multiplier and the resulting final product in listing relation, actuating means adapted to secure the setting of the final product, means operating upon such setting adapted to set said printing devices in accordance with the settings of said selective manipulative means and of said accumulative means, means for clearing the machine, and means for maintaining the settings of said printing devices until the machine is cleared.

51. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, and mutually cooperating means set in accordance with the settings of said selective manipulative means and of said accumulating means adapted to list the multiplicand and the multiplier so set up in coordination with the final product so set up.

52. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, means for listing the multiplicand, the multiplier and the resulting final product, and means operating automatically and as an incident to the setting of the final product adapted to set said listing means in accordance with the settings of said selective manipulative means and of said accumulating means.

53. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, and mutually cooperating means set by said selective manipulative means and by said accumulating means upon setting up thereby of the multiplicand, the multiplier and the resulting final product adapted to list the multiplicand and the multiplier in coordination with the resulting final product.

54. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, and means for listing the multiplicand and the multiplier in coordination with the resulting final product comprising, printing devices set by said selective manipulative means upon setting up of the multiplicand and multiplier thereby, and a printing device set by said actuating means upon setting up of the product thereby.

55. In a machine of the character described, the combination with selective manipulative means for setting up a multi-digit multiplicand and a multi-digit multiplier, of means controlled thereby for setting up and segregating the various resulting partial products, means for accumulating the partial products in order to set up the resulting final product, a platen adapted to receive a record strip, and printing devices set by said selective manipulative means and said accumulating means upon setting up thereby of the multiplicand, multiplier and final product adapted to print said items in listing relation on the strip.

56. In a machine of the character described, the combination with selective manipulative means for setting up the multiplier and multiplicand, of partial products setting up devices controlled thereby, receiving elements arranged in a bank and connected to be set by said devices in order to set up the partial products in the respective elements, and means in said bank for condensing the settings therein to produce the final product.

57. In a machine of the character described, the combination with selective manipulative means for setting up the multiplier and multiplicand, of partial products setting up devices controlled thereby, receiving elements arranged in a bank and connected to be set by said devices in order to set up the partial products in the respective elements, means in said bank for condensing the settings therein to produce the final product, and product designating means connected to be set by said elements.

58. In a machine of the character described, the combination with selective manipulative means for setting up the multiplier and multiplicand, of partial products setting up devices controlled thereby, receiving elements arranged in banks corresponding to the orders of the product and connected to be set by said devices in order to set up the partial products in the respective banks, and means in said banks for condensing the settings therein to produce the final product.

59. In a machine of the character described, the combination with selective manipulative means for setting up the multiplier and multiplicand, of partial products setting up devices controlled thereby, receiving elements arranged in banks corresponding to the orders of the product and connected to be set by said devices in order to set up the partial products in the respective banks, means in said banks for condensing the settings therein to produce the final product, and product designating means each connected to be set by its corresponding bank.

60. In a machine of the character described, the combination with selective manipulative means for setting up the multiplier and multiplicand, of partial products setting up devices controlled thereby, receiving elements connected to be set by said devices, each element having a series of digital stops, and means for moving said elements relatively until arrested by their stops in order to condense the receiver settings.

61. In a machine of the character described the combination with selective manipulative means for setting up the multiplier and multiplicand, of partial products setting up devices controlled thereby, receiving elements arranged in banks and connected to be set by said devices, each element having a series of digital stops, and means for moving the elements in each bank relatively until arrested by their stops in order to condense the receiver settings.

In testimony whereof we affix our signatures this 20th day of December, 1924.

LUTHER A. WATTERS.
ADOLF BAUMANN.
CARL P. HORLACHER.

CERTIFICATE OF CORRECTION.

Patent No. 1,838,647.  Granted December 29, 1931, to

LUTHER A. WATTERS ET AL.

It is hereby certified that error appears in the printed specification of the above numbered patent requiring correction as follows: Page 2, line 129, strike out the article "a"; page 17, line 95, claim 14, before the word "of" insert the words arranged for parallel relative movement; same page, line 103, claim 15, after "one" insert the words of said; and that the said Letters Patent should be read with these corrections therein that the same may conform to the record of the case in the Patent Office.

Signed and sealed this 5th day of April, A. D. 1932.

(Seal)

M. J. Moore,
Acting Commissioner of Patents.